US008135497B2

(12) United States Patent
Joslyn

(10) Patent No.: US 8,135,497 B2
(45) Date of Patent: Mar. 13, 2012

(54) PORTABLE, PERSONAL MEDICATION DISPENSING APPARATUS AND METHOD

(76) Inventor: Matthew I. Joslyn, Brookline, MA (US)

(*) Notice: Subject to any disclaimer, the term of this patent is extended or adjusted under 35 U.S.C. 154(b) by 213 days.

(21) Appl. No.: 12/686,535

(22) Filed: Jan. 13, 2010

(65) Prior Publication Data

US 2011/0172812 A1 Jul. 14, 2011

(51) Int. Cl.
*G06F 17/00* (2006.01)
*B65D 83/04* (2006.01)
*G05B 5/00* (2006.01)

(52) U.S. Cl. ........ 700/237; 700/243; 700/232; 700/242; 221/10; 221/13

(58) Field of Classification Search .................. 700/231, 700/232, 237, 240, 242–243; 221/10, 13
See application file for complete search history.

(56) References Cited

U.S. PATENT DOCUMENTS

| | | | | |
|---|---|---|---|---|
| 2,587,928 | A * | 3/1952 | Tuck et al. | 221/25 |
| 3,279,651 | A | 10/1966 | Thompson | |
| 3,450,306 | A * | 6/1969 | Gill | 221/71 |
| 3,871,551 | A | 3/1975 | Bender | |
| 3,964,638 | A | 6/1976 | Dimauro | |
| 4,274,550 | A * | 6/1981 | Feldstein | 221/71 |
| 4,298,125 | A | 11/1981 | Berghahn et al. | |
| 4,428,502 | A | 1/1984 | Veltri | |
| 4,437,579 | A * | 3/1984 | Obland | 221/25 |
| 4,504,153 | A | 3/1985 | Schollmeyer et al. | |
| 4,573,606 | A | 3/1986 | Lewis et al. | |
| 4,627,432 | A | 12/1986 | Newell et al. | |
| 4,733,797 | A | 3/1988 | Haber | |
| 4,747,514 | A | 5/1988 | Stone | |
| 4,823,982 | A | 4/1989 | Aten et al. | |
| 4,971,221 | A | 11/1990 | Urquhart et al. | |
| 5,047,948 | A | 9/1991 | Turner | |
| 5,119,969 | A | 6/1992 | Haber | |
| 5,176,285 | A | 1/1993 | Shaw | |
| 5,213,232 | A | 5/1993 | Kraft et al. | |

(Continued)

FOREIGN PATENT DOCUMENTS

KR 1020060030990 A 4/2006

OTHER PUBLICATIONS

International Search Report, International Application No. PCT/US2010/061463, dated Sep. 14, 2011, International Searching Authority, Korean Intellectual Property Office.

*Primary Examiner* — Michael K Collins
(74) *Attorney, Agent, or Firm* — Lathrop & Gage LLP; Steven M. Mills, Esq.

(57) ABSTRACT

A portable, medication dispensing device which dispenses prepackaged pill strands of medication from a secure, storage compartment through a mechanism which physically limits the quantity dispensed per a pre-programmed protocol. The device has a detachable storage component which can be filled by trained clinical or pharmacy staff, which can be locked. The device has a dispensing mechanism, which employs a user-powered, hub to advance a pill strand of pre-packaged medications, when appropriate. This advancing hub is secured from advancing inappropriately by a locking mechanism where a sturdy piston is moved into and out of recesses in the rounded surface of the hub. The device also contains standard electronic components, including a power source, central processing unit (CPU), visual and auditory outputs, and communications ports.

20 Claims, 16 Drawing Sheets

U.S. PATENT DOCUMENTS

| | | | | |
|---|---|---|---|---|
| 5,230,441 | A | 7/1993 | Kaufman et al. | |
| 5,346,069 | A | 9/1994 | Intini | |
| 5,368,187 | A | 11/1994 | Poncetta et al. | |
| 5,377,839 | A | 1/1995 | Relyea et al. | |
| 5,392,952 | A | 2/1995 | Bowden | |
| 5,564,593 | A | 10/1996 | East, Sr. | |
| 5,755,357 | A | 5/1998 | Orkin et al. | |
| 5,865,342 | A | 2/1999 | Ito et al. | |
| 5,963,453 | A | 10/1999 | East | |
| 6,032,085 | A | 2/2000 | Laurent et al. | |
| 6,036,018 | A | 3/2000 | Harrold | |
| 6,062,797 | A | 5/2000 | Gaines | |
| 6,073,799 | A | 6/2000 | Yuyama et al. | |
| 6,175,779 | B1 | 1/2001 | Barrett | |
| 6,194,995 | B1 | 2/2001 | Gates | |
| 6,286,714 | B1 | 9/2001 | Pearson et al. | |
| 6,308,860 | B2 | 10/2001 | Eagle | |
| 6,318,051 | B1 | 11/2001 | Preiss | |
| 6,394,308 | B1 | 5/2002 | Yuyama et al. | |
| 6,457,611 | B1 | 10/2002 | Koehler | |
| 6,527,138 | B2 | 3/2003 | Pawlo et al. | |
| 6,581,797 | B2 | 6/2003 | McKinney, Jr. et al. | |
| 6,594,549 | B2 | 7/2003 | Siegel | |
| 6,601,729 | B1 * | 8/2003 | Papp | 221/25 |
| 6,766,920 | B2 | 7/2004 | Yuyama et al. | |
| 6,814,255 | B2 | 11/2004 | Liff et al. | |
| 6,848,593 | B2 | 2/2005 | Papp | |
| 6,874,652 | B2 * | 4/2005 | Christensen et al. | 221/30 |
| 7,040,505 | B2 | 5/2006 | Hashimoto et al. | |
| 7,100,793 | B2 | 9/2006 | Baum | |
| 7,108,153 | B2 | 9/2006 | Wood | |
| 7,129,819 | B2 | 10/2006 | Chiavetta et al. | |
| 7,151,982 | B2 | 12/2006 | Liff et al. | |
| 7,186,176 | B2 | 3/2007 | Umeda | |
| 7,347,341 | B2 | 3/2008 | Burggraf | |
| 7,359,765 | B2 | 4/2008 | Varvarelis et al. | |
| 7,383,674 | B2 | 6/2008 | Van Eenoo | |
| 7,395,946 | B2 | 7/2008 | Yuyama et al. | |
| 7,775,205 | B2 * | 8/2010 | Edgerley | 128/203.21 |
| 2004/0172162 | A1 * | 9/2004 | Bonney et al. | 700/237 |
| 2005/0017017 | A1 * | 1/2005 | Crosby et al. | 221/25 |
| 2005/0154491 | A1 | 7/2005 | Anderson et al. | |
| 2005/0205598 | A1 | 9/2005 | Gelardi | |
| 2006/0196504 | A1 | 9/2006 | Augustyn et al. | |
| 2007/0093935 | A1 | 4/2007 | Fu | |
| 2010/0089936 | A1 * | 4/2010 | Luciano et al. | 221/1 |

* cited by examiner

PORTABLE, PERSONAL MEDICATION DISPENSING APPARATUS AND METHOD

TECHNICAL FIELD

The present invention is related to a portable, personal medication dispensing apparatus and method. More particularly, the present invention is related to a portable, personal medication dispensing apparatus and method in which access to the medication is controlled and monitored.

BACKGROUND OF INVENTION

Certain classes of medications have, as a consequence of their intended action, the proclivity to cause physiologic dependence. In this context, the risk of addictive behaviors and all of those consequences becomes very high, as has been well described in the medical literature, and is a commonly known fact to regulatory and law enforcement, and in large part, to the general population. The consequences have also been well described, in terms of harms to the individual, family/social, and community/public health, and much has been said about the economic costs to health systems, law enforcement, and lost productivity, as well as the professional and even legal liability of clinicians, pharmacists, and pharmaceutical manufacturers. Yet, in spite of these harms, costs, and liabilities, the consensus of the medical profession is that these medications are essential tools in the task of diminishing physical and mental suffering.

The problem has been difficult to approach, and advances have been made in education of clinicians and pharmacists, electronic pharmacy and medical records, electronic prescribing, and professional and governmental monitoring. However, there have been few attempts to manage the problem at the patient/user level.

The medical profession has determined that the risk of addiction and diversion of these medications is so great that means have been developed to protect clinical professionals by making access to these medications difficult. That is, clinical professionals cannot trust their own intellectual understanding about addiction and professional codes of conduct to prevent them from the temptations of misuse. However, in clinical practice, the patient is entrusted to a large quantity of the medications and instructed to use sparingly, "as ordered." The likelihood of success against impulse overlapping symptoms is poor. The necessity to provide a barrier to the impulsive use of the medications, while not a solution to abuse, is already the standard of care in the professional environment and needs to be in ambulatory medicine as well.

Medications, which are listed by the Drug Enforcement Agency (DEA) as Schedule II medications which have dependency and addiction potentials, hereinafter referred to as controlled medications, pose an even greater risk to people who suffer from dependency and addiction problems. People who require the controlled medications to diminish physical and mental pain and that suffer from dependency and addiction problems are at a huge risk for misuse of the controlled medications.

SUMMARY

The present inventive concept is directed to a device and method which can contain these medications securely, and release them according to a programmed schedule, which provides a significant barrier to misuse, especially in the context of the chronic, ongoing use of these medications. By providing a secure, timed release of a medication, which can be programmed by a clinician, and loaded by a pharmacist, the quality of care for these individuals is greatly improved, and inappropriate use of controlled medications is decreased. Additionally, clinical care is improved by documenting use patterns of appropriately prescribed medications, thus helping the clinician understand the patient's symptoms and aggravators, and respond appropriately.

It is a feature of the inventive concept to prevent premature or inappropriate patient/user access to the medication.

It is another feature of the inventive concept to reliably provide the medication to the patient/user when it is appropriate.

It is another feature of the inventive concept to electronically track and document the usage of the device.

It is another feature of the inventive concept to interface with software written for standard personal computers, in order to program and document the use of the device.

In accordance with an aspect of the inventive concept, a portable medication dispenser includes a detachable storage chamber storing pills packaged in a pill strand, the detachable storage chamber having a first opening for the pill strand to pass through and a docking section and a main body. The main body includes an external, rotating knob, an opening for the pill strand to pass through, a docking section to secure to the docking section of the storage chamber, a rotating hub rotatable by the external knob, the rotating hub engaging the pill strand moving the pill strand through the storage chamber and the main body and including cogged edges for engaging with the pill strand and recesses spaced apart a predetermined distance along the center of a curved surface of the rotating hub, a locking rod under spring tension to be positioned securely within the recesses of the rotating hub locking the rotating hub from advance, and a controlling mechanism controlling the locking rod controlled by programming of the device to retract the locking rod allowing advance of the rotation hub at predetermined times, and an extruding rod under spring tension movable by force to move in a direction to force a pill out of the pill strand into a holding chamber. The portable medication dispenser is programmable to control the locking rod and controlling mechanism to control the advancement of the rotating hub and pill strand.

In one embodiment, the portable medication dispenser includes a visual display. In another embodiment, the visual display is an LCD display.

In one embodiment, the portable medication dispenser further includes auditory outputs.

In one embodiment, the portable medication dispenser further includes input/output ports.

In one embodiment, the portable medication dispenser further includes a power supply.

In one embodiment, the controlling mechanism is an electromechanical solenoid.

In one embodiment, the predetermined distance between recesses corresponds to the size of a single unit of the pill strand.

In one embodiment, the extruding rod is moved by a user.

In one embodiment, the docking section of the storage chamber includes a second opening through which the pill strand passes through into the docking section.

In one embodiment, the portable medication dispenser further includes a locking mechanism locking the storage chamber to the main body at the docking section of the storage chamber and the docking section of the main body. In another embodiment, the locking mechanism includes a lug coupled to the docking section of the storage chamber, a rotating sleeve in the docking section of the main body rotatable around the lug, a key hole and lock in the docking section of the main body, and a key for rotating the rotating sleeve around the lug.

In one embodiment, the portable medication dispenser further includes a ratchet assembly restricting movement of the rotating hub in a single direction. In another embodiment, the ratchet assembly comprises a gear and pawl. In another embodiment, the ratchet assembly further includes a sensor measuring the advance of the rotating hub. In another embodiment, the ratchet assembly further comprises an electrical motor.

In one embodiment, the portable medication dispenser further includes a shaft of the knob and rotating hub being a first fail point.

In another aspect of the inventive concept, a method of dispensing pills includes programming a pill dispensing device to output pills at predetermined times, filling a storage chamber of the pill dispensing device with a pill strand, pulling the pill strand through an opening in the storage chamber to engage with a rotating hub in a main body of the pill dispensing device, and coupling the storage chamber to the main body and locking the storage chamber and main body together using a locking mechanism. The method further includes providing an indicator when a pill is available to be dispensed from the pill dispensing device, controlling a control mechanism to retract a locking rod from a recess in the rotating hub allowing advance of the rotating hub at the programmed predetermined times and to return the locking rod to a subsequent recess upon advance of the rotating hub, rotating a knob on the main body to advance the hub and the pill strand, and extruding a pill from the pill strand using an extruding rod under spring tension movable by force to move in a direction to force a pill out of the pill strand into a holding In one embodiment, the method further includes sensing and storing the number of pills dispensed and the distance advanced by the rotating hub.

In one embodiment, the method further includes sensing and storing attempts to rotate the knob and dispense a pill.

BRIEF DESCRIPTION OF THE DRAWINGS

The foregoing and other features and advantages of the invention will be apparent from the following more particular description of preferred embodiments of the inventive concept, as illustrated in the accompanying drawings in which like reference characters refer to the same parts throughout the different views. The drawings are not necessarily to scale, emphasis instead being placed upon illustrating the principles of the inventive concept.

DETAILED DESCRIPTION

According to an embodiment of the present inventive concept, a device dispenses controlled medications in a secure fashion to patient/users at a programmed or prescribed time. By providing a secure, timed release of a medication, which can be programmed by a clinician, a physician or other person controlling treatment of a patient, and loaded by a pharmacist, the quality of care for individuals is greatly improved, and inappropriate use of controlled medications is decreased. The device is especially useful for patients with dual issues of needing the controlled medications and having addiction/dependency problems. Additionally, such a device contributes to clinical care by documenting use patterns of appropriately prescribed medications, thus helping the clinician understand the patient's symptoms and aggravators, and respond appropriately.

The use of the device is applicable for use in the clinical context of medications which are listed by the DEA as Schedule II medications which have dependency and addiction potentials. However, the use of the device may also be used for non-Schedule II medications. The functions of the device include storing the medications in a secure fashion, inaccessible to the patient/user, to allow dispensing of a medication at clinically prescribed times, and reliably supplying the patient/user with the prescribed medication(s). The device has a detachable storage component which can be filled by trained clinical or pharmacy staff, which can be locked. The device has a dispensing mechanism, which employs a user-powered, cogged wheel or hub to advance a pill strand of pre-packaged medications, when appropriate. The advancing of the hub is secured from advancing inappropriately by a locking mechanism where a sturdy piston is moved into and out of recesses in the rounded surface of the hub. The device also contains electronic components, including a power source, central processing unit (CPU) with memory and other associated circuitry, visual and auditory outputs, and input/output ports or communications ports.

The device is sturdy in construction, and is made of, for example, a strong plastic material. However, it is not indestructible. Since its use is in the context of a clinical relationship, it is expected that the patient/user will be required to present the device with no signs of damage or tampering for continued prescription of the medications. Communications with the device are possible for the clinician/pharmacist. The type of information and the means of retrieving and controlling it may be the product of various embodiments of the pill dispensing device. A display of a usage log on an LCD screen may be available to the clinician/pharmacist. Alternatively, communications ports may provide for more complex data reporting and programming through software run on personal computers of the clinician/pharmacist.

Figure 1:
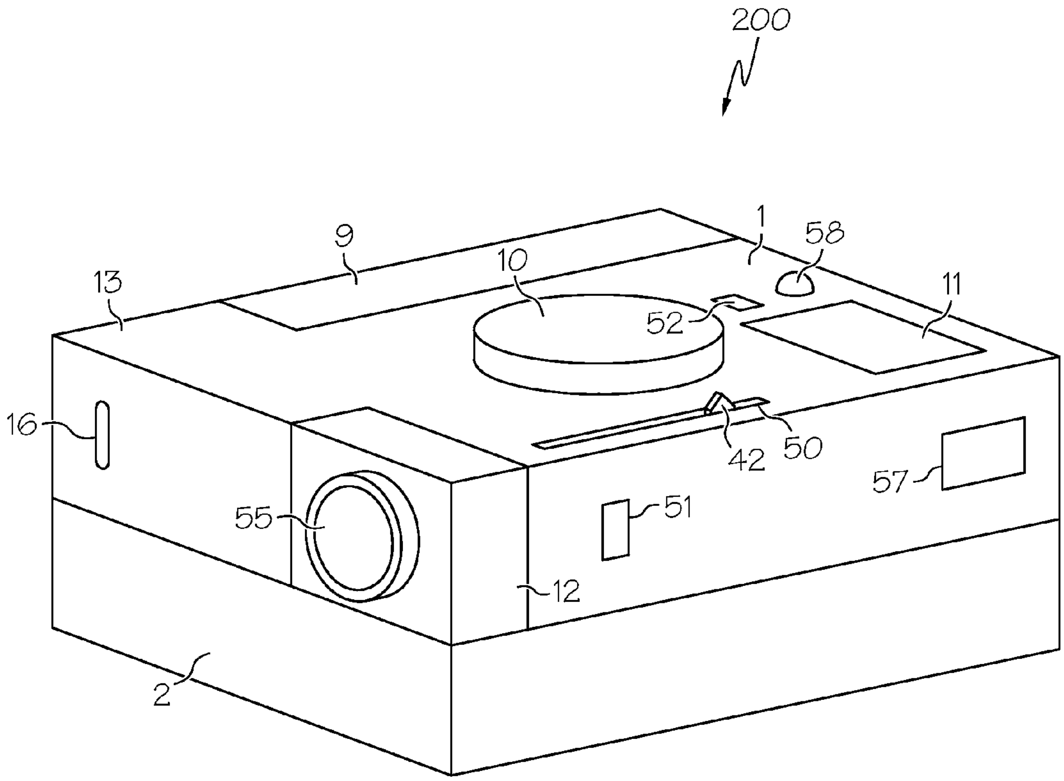
FIG. 1 is a perspective view of an exterior of a pill dispensing device according to an exemplary embodiment of the present inventive concept.
Figure 2:
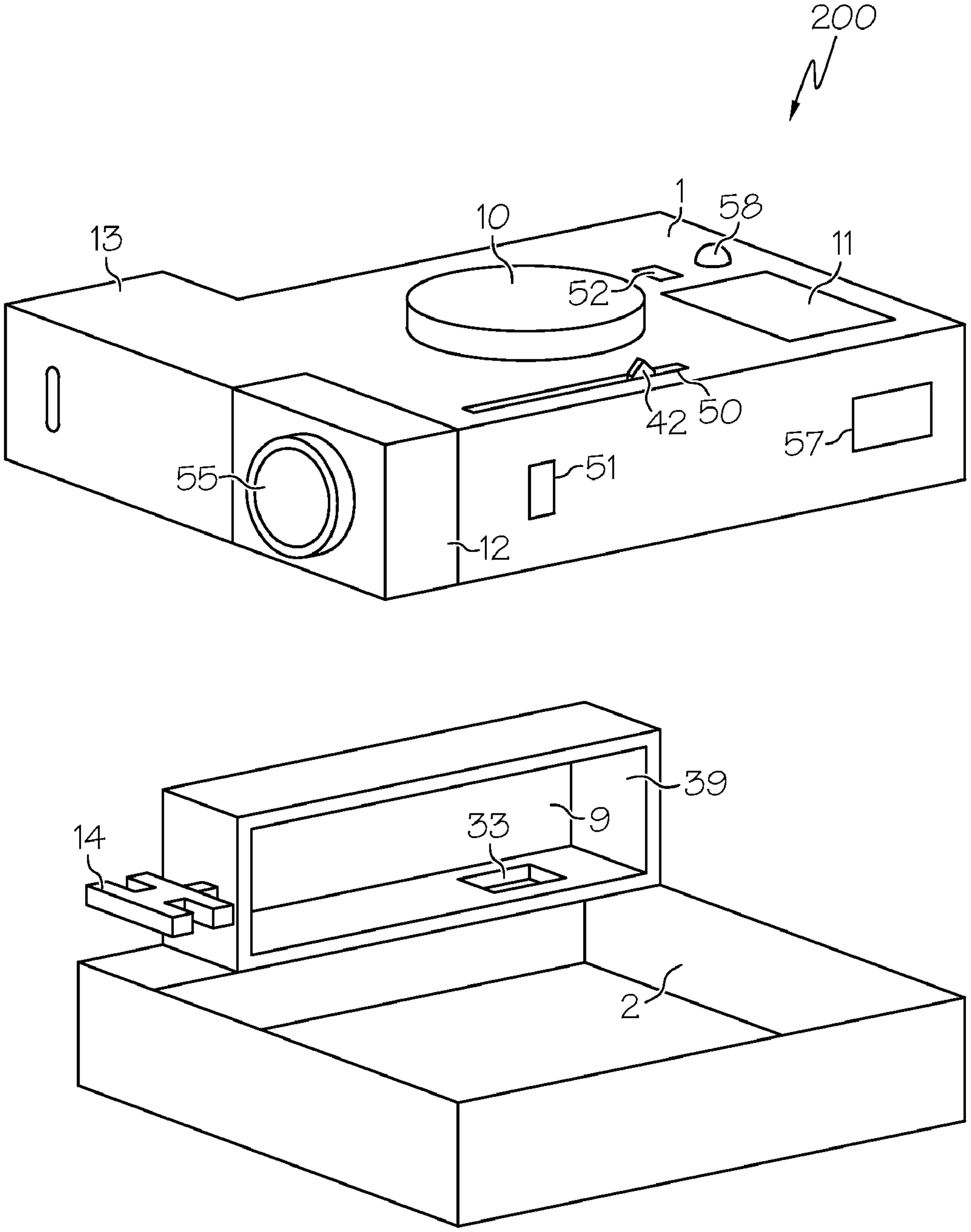
FIG. 2 is a perspective view of an exterior of the pill dispensing device of FIG. 1 with a main body and storage chamber component separated, according to an exemplary embodiment of the present inventive concept.
Figure 3:
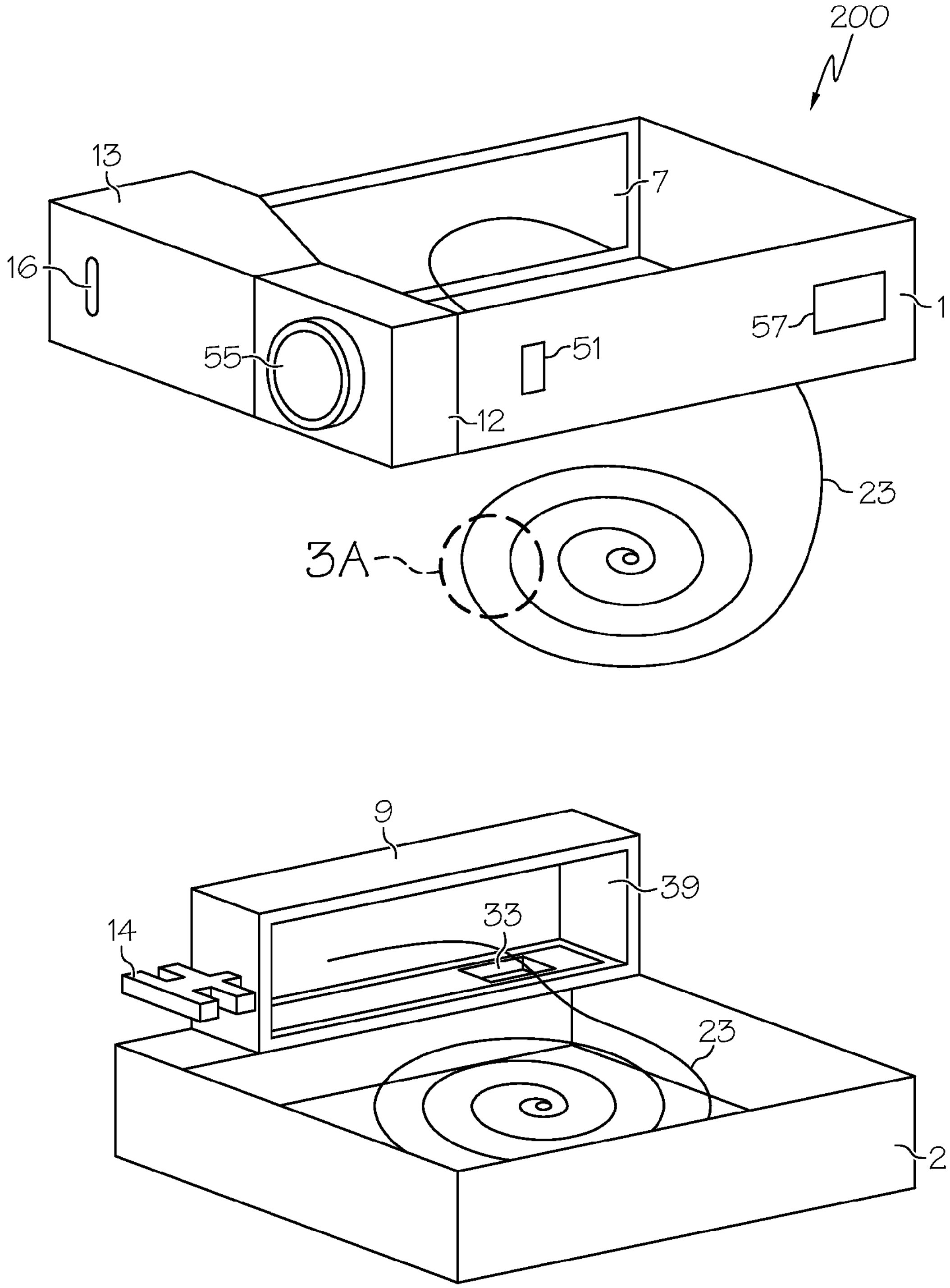
FIG. 3 is a perspective view of the pill dispensing device of FIG. 1 with the main body and the storage chamber component separated, illustrating a pathway of a pill strand, according to an exemplary embodiment of the present inventive concept.
Figure 3A:
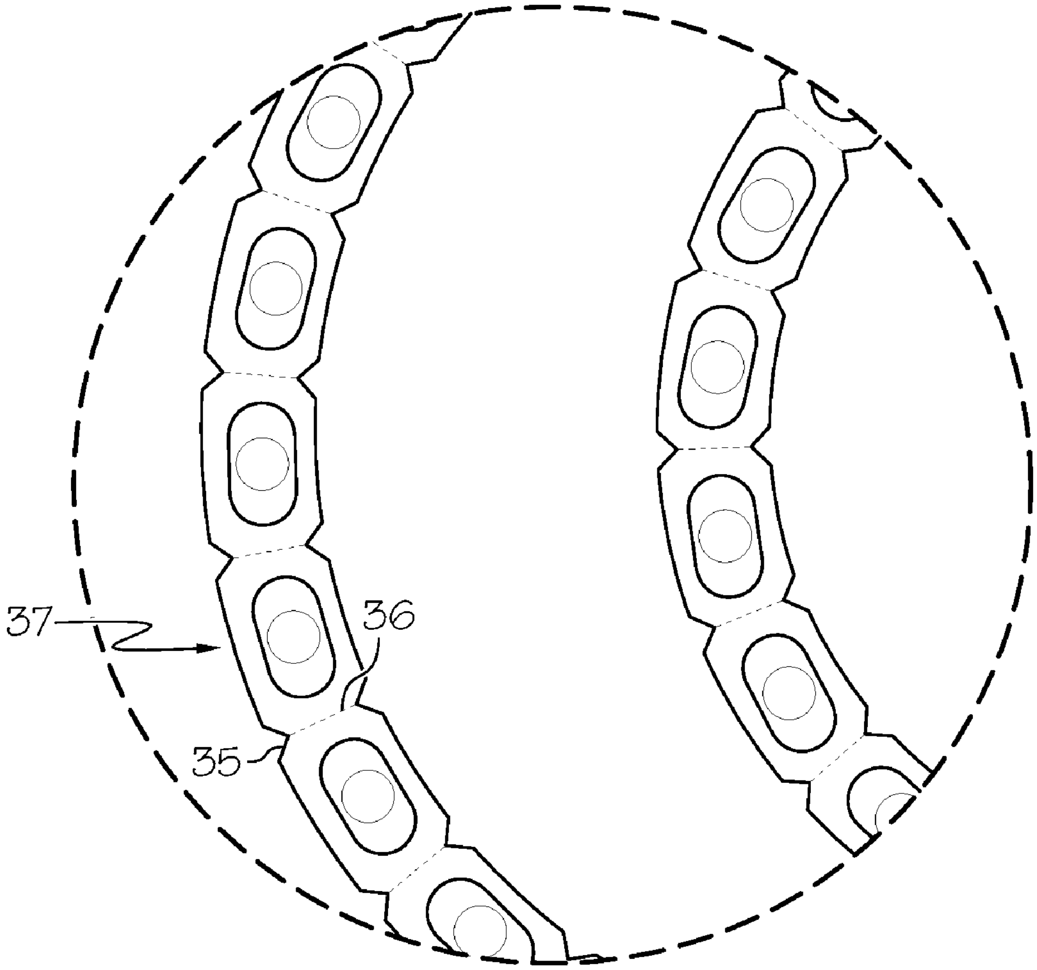
FIG. 3A is a detailed view illustrating the pill strand of FIG. 3, according to an exemplary embodiment of the present inventive concept.

FIG. 1 is a perspective view of an exterior of a pill dispensing device 200 according to an exemplary embodiment of the present inventive concept. The pill dispensing device 200 includes a main body 1 and a storage chamber component 2, which are securely locked together. FIG. 2 is a perspective view of an exterior of the pill dispensing device 200 of FIG. 1 with the main body 1 and storage chamber component 2 separated, according to an embodiment of the present inventive concept. FIG. 3 is a perspective view of the pill dispensing device 200 of FIG. 1 with the main body 1 and the storage chamber component 2 separated, illustrating a pathway 23 of a pill strand 37. In FIG. 3, a portion of a top surface of the main body 1 is removed and the inner elements of the device are not illustrated to facilitate a clear illustration of the pathway 23 of the pill strand 37 from the storage chamber component 2 to the main body 1. FIG. 3A is a detailed view illustrating the pill strand 37 of FIG. 3. The device 200 is formed, for example, of a sturdy plastic or other sturdy material and includes the storage chamber component 2 and the dispensing component or main body 1. The storage chamber component 2 is shaped to receive and hold standardized medication packaging in a single-file configuration, hereinafter a pill strand 37.

FIG. 3A is a detailed view illustrating the pill strand of FIG. 3. The pill strand 37 is a typical, industry standard "bubble" packaging, as illustrated in FIG. 3A, which allows for single pill dispensing and is constructed so that the pill is easily extruded without damage to the pill. In an exemplary embodiment, the pill strand 37 to which the inventive concept is applicable is a single-file strand of the packaging material with standardized distance between pills, regardless of the pill size, and the standardized distance correlates with the distance the device rotates to advance a single pill length of the pill strand 37. The pill strand 37 includes regular openings or wide serrations 35 along both sides of the pill strand 37. The size and distance between the serrations 35 correlate with hub teeth or cogs within or on a hub, which allow the hub to securely engage the pill strand 37 and cause it to advance through the device 200. Easy-tear serrations 36 between each pill bubble allow for easy disposal of the empty packaging material as it is advanced out of the device 200 through an opening 51, as illustrated in FIGS. 1 and 2.

Referring to FIGS. 1, 2 and 3, docking sections of the storage chamber component 2 and the main body 1 have a physical and electronic lock, accessible by professional staff, and a passageway through which the pill strand 37 may pass into the main body 1 from the storage chamber component 2. The device 200 also may include electronic components which allow for programmable operation of the device, detection and storage of data relevant to the medication, a patient/user interface(s) for electronic communication, and a power source.

In FIG. 1, the main body 1 and storage chamber component 2 are shown separated from each other. The storage chamber component 2 is loaded by a pharmacy or clinical staff, hereinafter professional staff, with a particular medication packaged in an industry-standard bubble-pack configured in a single-file strip, which can be either folded or in spiral form, for example, pill strand 37, according to a prescription written by a clinician. The pill dispensing device 200 is programmed by the pharmacist based on the clinician's prescription such that the pills are only dispensed at prescribed periods of time.

Referring to FIGS. 1, 2 and 3, the storage chamber component 2 is of a sturdy, tamper-resistant construction with a docking section 9 at which it is secured to the main body 1 by a physical or electronic lock. In use, a standardized physical key would be available only to professional staff, which may or may not have an electronic component, whereas an electronic passkey may be required to advance the lock and open the device. The docking section 9 also has an opening 33 through which the pill strand 37 is advanced into the docking section 9 and another opening 39 through which the pill strand 37 advances to engage with the dispensing mechanism of the main body 1. The openings 33 and 39 may be of various sizes. FIGS. 2 and 3 illustrate the opening 33 as being a portion of a side wall of the docking section 9; however, the opening is not limited to that configuration. For example, the opening 33 may extend across the entire side wall of the docking section 9. FIGS. 2 and 3 illustrate the opening 39 extending across an entire side wall of the docking section 9; however, the opening 39 may extend across only a portion of the side wall of the docking section 9.

The storage chamber component 2 of the device can vary considerably in its shape and size, allowing flexibility to accommodate variations in the size and shape of the pill strand 37 and quantity of pills being dispensed. The docking section 9 physically secures the storage chamber component 2 to the main body 1 of the device 200. Accordingly, it has corresponding shape and lock components to those of a docking mechanism 13 of the main body 1, as illustrated and described in connection with FIGS. 2 and 6A-6C. The side of the storage chamber component 2 that is in physical contact with the main body 1 and a side along the main body 1 may have mating or complementary rail and lip construction, which allows for increased strength in the physical union of the two components by sliding the storage chamber component 2 into place before mating into the docking mechanism itself and the physical lock. The storage chamber component 2 includes a lug 14 for mating with a locking sleeve 15 of the main body 1.

Figure 4A:
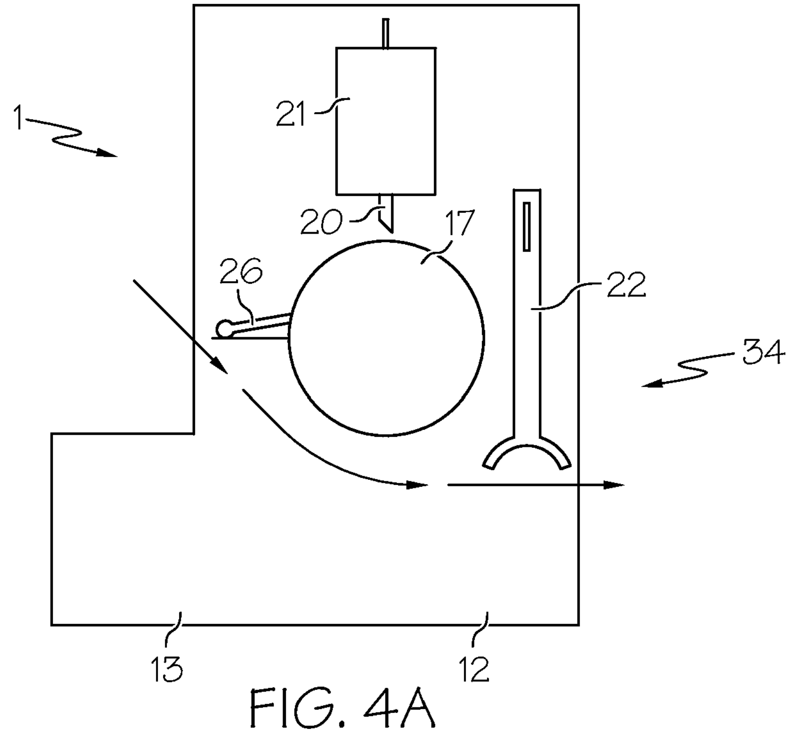
FIG. 4A is a cross-sectional view of the main body of the pill dispensing device of FIG. 1, according to an exemplary embodiment of the present inventive concept.
Figure 4B:
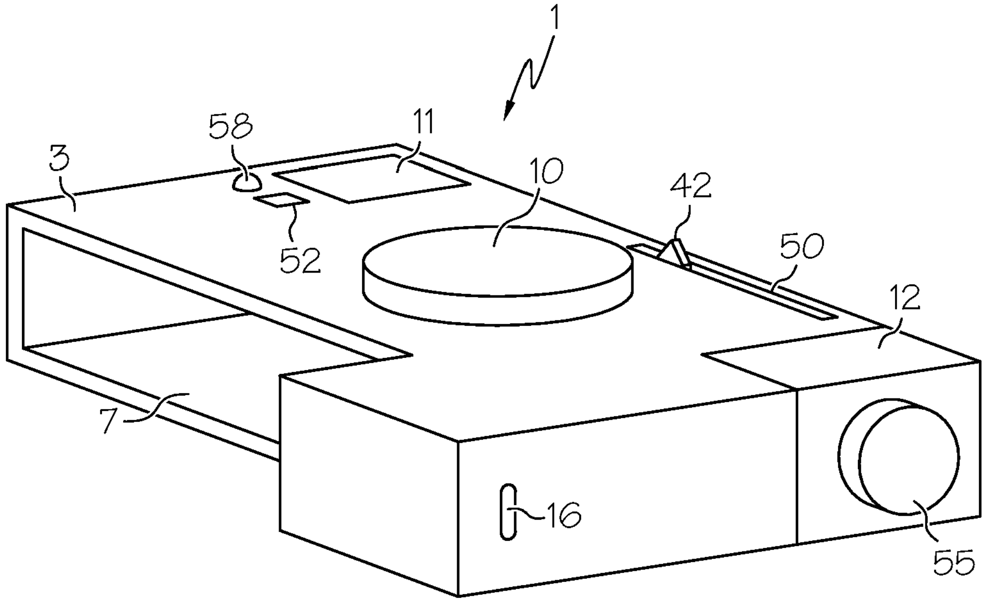
FIG. 4B is a perspective view of the main body of the pill dispensing device of FIG. 1, according to an exemplary embodiment of the present inventive concept.
Figure 5:
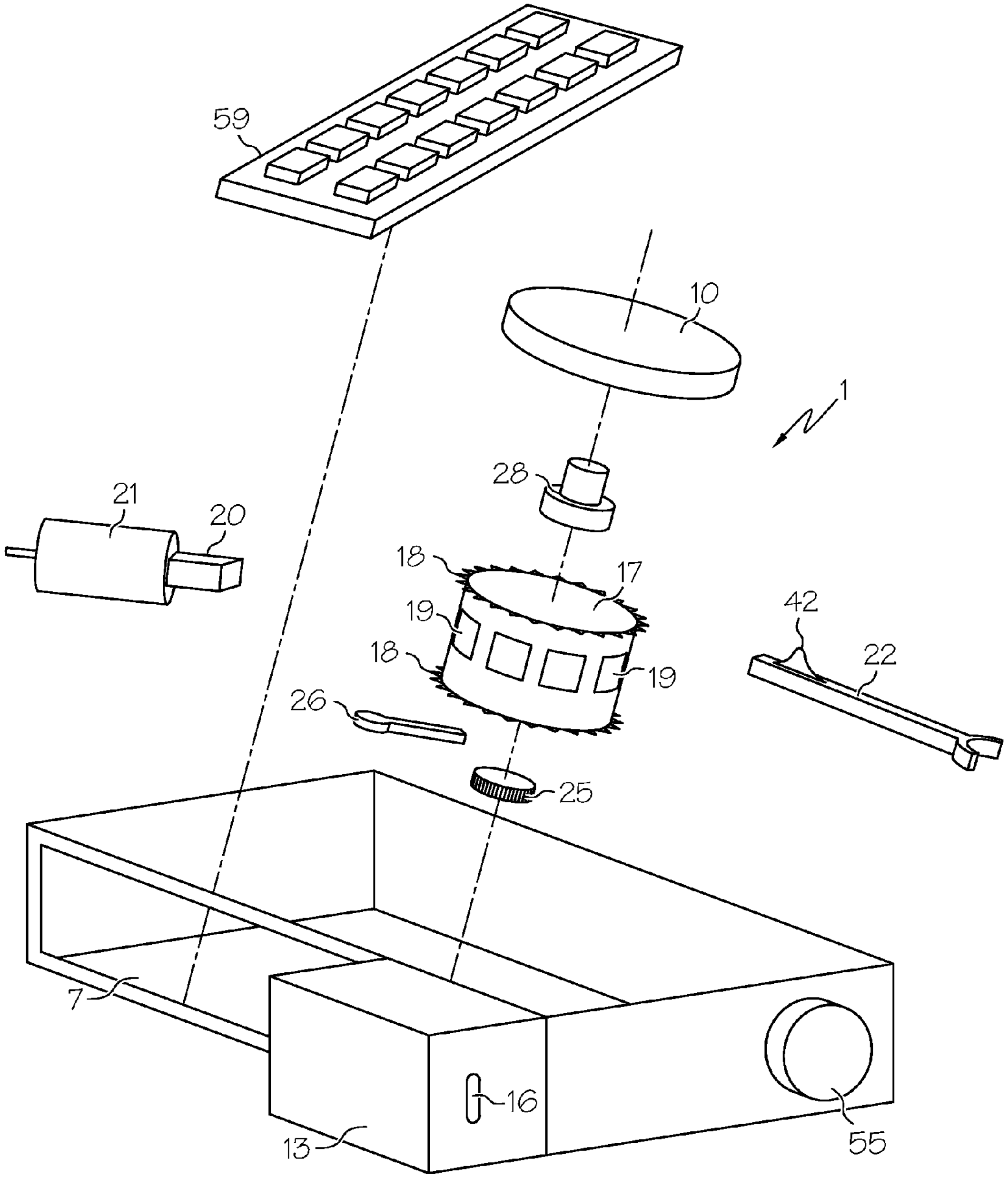
FIG. 5 is an exploded view of the main body of the pill dispensing device of FIG. 1, according to an exemplary embodiment of the present inventive concept.

The main body 1, as illustrated in FIGS. 1, 2 and 3, of the device 200 has a sturdy construction made of, for example, plastic. FIG. 4A is a cross-sectional view of the main body 1 of the pill dispensing device 200 of FIG. 1, according to an exemplary embodiment of the present inventive concept. FIG. 4B is a perspective view of the main body 1 of the pill dispensing device 200 of FIG. 1, according to an exemplary embodiment of the present inventive concept. FIG. 5 is an exploded view of the main body 1 of the pill dispensing device 200 of FIG. 1, according to an exemplary embodiment of the present inventive concept. Referring to FIGS. 1, 2, 3, 4A, 4B and 5, one side of the main body 1 includes an opening 7 as illustrated in FIGS. 3, 4B and 5, and the docking mechanism 13, as illustrated in FIGS. 1, 2, 3, 4A, 4B and 5. The docking mechanism 13 docks to the storage chamber component 2. An ergonomically-shaped knob 10, which is rotatable by the user to advance the pill strand, is located externally on the top of the main body 1. An input/output user interface panel 11, which may contain visual and auditory output components and button or touch-type inputs, is located on the top surface of the main body 1 of the device 200. The main body 1 may further include a light 58, for example an LED light, and an audible output 52, for example a speaker or annunciator. A communication port 57, for example, a Universal Serial Bus (USB) port, may be included on the main body 1. A holding chamber 12 with a standard, screw-top cap 55 is located at an end of the main body 1. The holding chamber 12 holds the pill after it is dispensed, and the patient/user can access the dispensed pill in the holding chamber 12 by removing the screw-top cap 55. The screw cap 55 can be a child-proof cap. A slot 50 is located on the top surface of the main body 1 of the device 200. A thumb tab 42 of an extruding rod 22 extends through the slot 50 and can be slid up and down to move the extruding rod 22 to extrude the pill from the pill strand 37. The extruding rod 22 pushes a pill out of the pill strand 37 into the holding chamber 12.

The docking mechanism 13 has a receiving end proximal to the opening 7 on the side of the main body 1, as illustrated in FIGS. 3, 4A, 4B and 5. As illustrated and described in connection with FIGS. 8A, 8B and 8C, the receiving end includes the locking sleeve 15 which securely mates with the lug 14 of the storage chamber component 2, as described in connection with FIGS. 2, 3, 8A, 8B and 8C. Referring to FIGS. 1, 2, 3, 4B and 5, the docking mechanism 13 includes a keyhole 16. As noted above, the side of the main body 1 and the mating storage chamber component 2 may have a complementary rail and lip construction. The rail and lip construction allows for increased strength in the physical union of the main body 1 and the storage chamber component 2 by sliding the storage chamber component 2 along the mating surface of the main body 1 before reaching the position of mating with the docking mechanism 13 and the locking sleeve 15. The opening 7 in the main body 1 is of sufficient size to allow passage of a pill strand 37, which contains the pills to be dispensed. The opening 7 mates with a complementary opening in the docking section 9 in the storage chamber component 2 through which the pill strand 37 is dispensed.

Referring to FIGS. 4A and 5, which contain internal views of the main body 1, the main body 1 includes the rotating hub 17, a locking rod 20, an electromechanical solenoid 21, the holding chamber 12, an extruding chamber 34, the extruding rod 22, electrical components 59, and the pathway 23 of the pill strand 37 as it moves through the device 200. The hub 17 rotates around an axis that is perpendicular to the top/bottom orientation of the main body. The hub 17 is connected to the external knob 10 by a shaft 28, which allows for the knob 10 to exert rotational forces on the hub 17 and cause it to rotate.

The edges of the hub 17 have a regularly raised, or cogged, surface, namely, hub teeth 18, intended to engage with complementary serrations 35 in the pill strand 37. The pill is advanced from the storage chamber component 2 by means of the rotating hub 17 with the hub teeth 18, which engage the serrations 35 on the pill strand 37, providing sufficient force to move the pill strand 37 through the main body 1. The rotation of the hub 17 is powered by the patient/user by means of exerting rotational force upon the external knob 10 directly connected with the shaft 28. The rotational force on the knob 10 advances the pill strand 37 into the extruding chamber 34, where the medication is extracted from the pill strand 37 by the patient/user-powered extraction rod 22 being moved through the pill strand 37 and is deposited into the holding chamber 12 by gravity.

Figure 9:
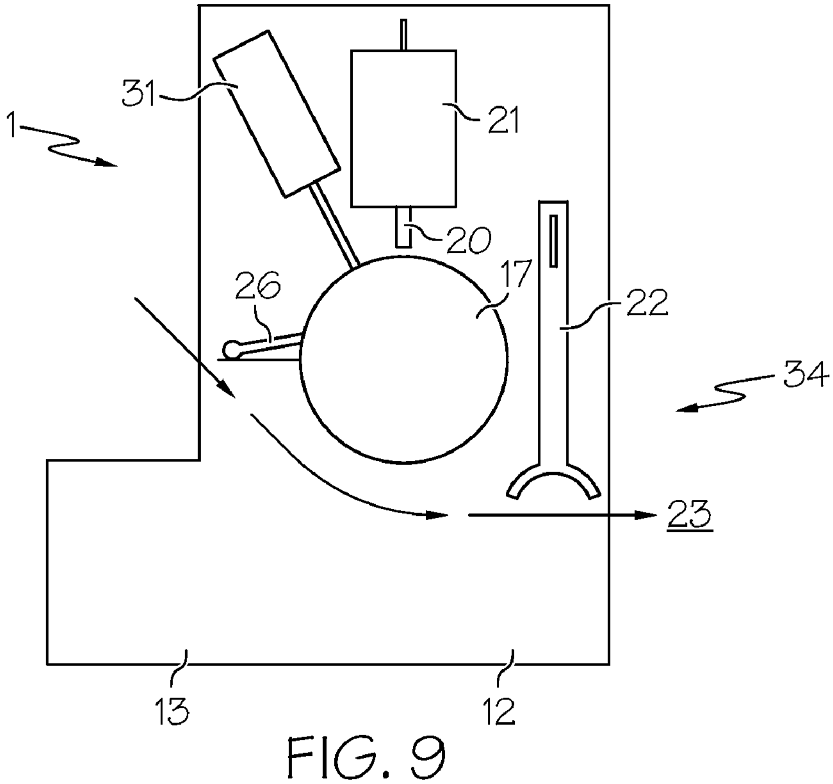
FIG. 9 is a cross-sectional view of an alternative embodiment of a main body of the pill dispensing device of FIG. 1.

Rotation of the hub 17 is controlled by a locking mechanism in which the sturdy locking rod 20 is inserted and withdrawn from recesses 19 in the core of the hub 17, upon certain programmed criteria being met. Additional embodiments may have a power-driven hub rotation, rather than user-powered rotation. These embodiments may employ any number of standard mechanisms which convert electrical to mechanical rotational forces, including an electrical motor 31 and gear arrangements, such as worm or bevel gears, as illustrated in FIG. 9, which is a cross-sectional view of an alternative embodiment of a main body 1 of the pill dispensing device 200 of FIG. 1. FIG. 9 includes the electrical motor 31 which drives the rotation of the hub 17.

Figure 6A:
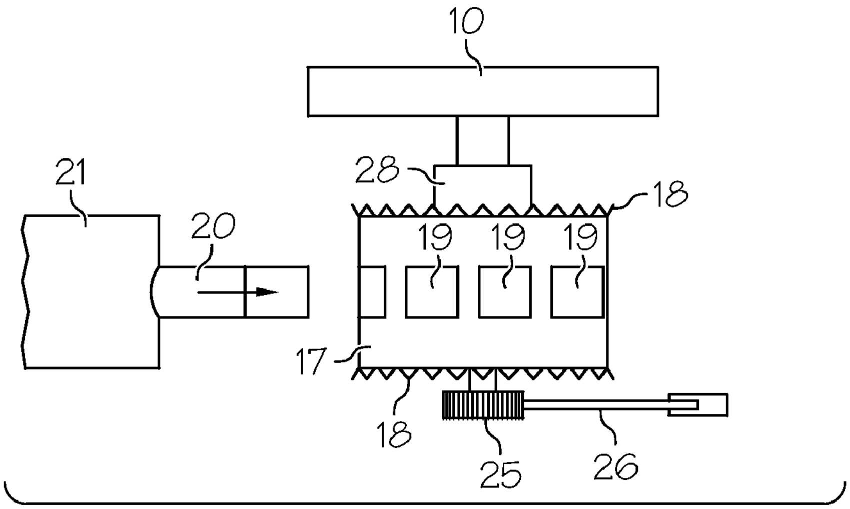
FIG. 6A is a side view of a rotating hub of the pill dispensing device of FIG. 1, according to an exemplary embodiment of the present inventive concept.

Referring to FIGS. 5 and 6A, the shaft 28, which connects the central advancing/rotating hub 17 to the external patient/user operated knob 10, represents the structural weakness of the device, as it is designed to be a point of first structural failure. That is, the shaft 28 includes a break-away feature which allows for a reliable point of first structural failure under excessive force. The shaft 28 is physically broken by excessive rotational forces applied to the device 200. The shaft 28 is a shaft within a larger diameter shaft, bound together by a small amount of construction material which allows for sufficient strength for common acceptable use, similar to a spot-weld, but breaks away under excessive force. This first structural failure disables the device 200 without allowing access to the medications, short of complete destruction of the device 200. It protects the locking mechanism, which includes the locking rod 20 and hub recess 19 from forced failure, which would allow for unlimited advance of the pill strand 37. This exemplary embodiment is described as including the break-away shaft 28; however, the present invention is not limited to this configuration. Other means of constructing such a strategic, first-fail point may be used. The purpose of this feature is security. An inappropriate attempt to force the device to dispense prior to the programmed time would not cause a failure of the locking rod 20, and allow unrestricted dispensing of the contained medications. Rather, a structural failure at this location would cause a failure of the shaft 28 between the hub 17 and knob 10, rendering the knob 10 unconnected, unable to exert force upon the rotation of the hub 17, effectively disabling the device 200. Thus, dispensing through any means other than destruction of the device itself is prevented.

Referring to FIGS. 4A, 5 and 6A, a gear 25 at a bottom of the hub shaft 28 has a regularly raised surface with smaller increments or knurling than the hub 17. The gear 25 is used to provide a smaller increment in measuring and controlling the rotation of the hub 17. At the gear 25, a standard ratcheting mechanism or pawl 26 can provide restriction of rotation, allowing the hub to rotate in only a single direction. The gear 25 and the pawl 26 function as a ratchet assembly. The gear 25 is on the same shaft as the hub 17. Hub rotation is limited to a single direction by the ratchet assembly at the base of the hub 17. The cogged surface of the hub 17 or the cogged surface of the gear 25 below the hub 17 on the same axle of rotation serves as the gearwheel component of the ratchet assembly. The pawl 26 is a spring loaded mechanical finger which restricts reverse rotation of the hub 17. Additionally, the pawl 26 can be associated with an electrical contact connected to the central electrical components of the dispensing device which counts or tracks the actual distance of rotation the hub travels in use. Additionally, the gear 25, with or without the pawl 26, may trigger an electronic contact, which measures the advance of the rotating surface of the hub 17.

Figure 6B:
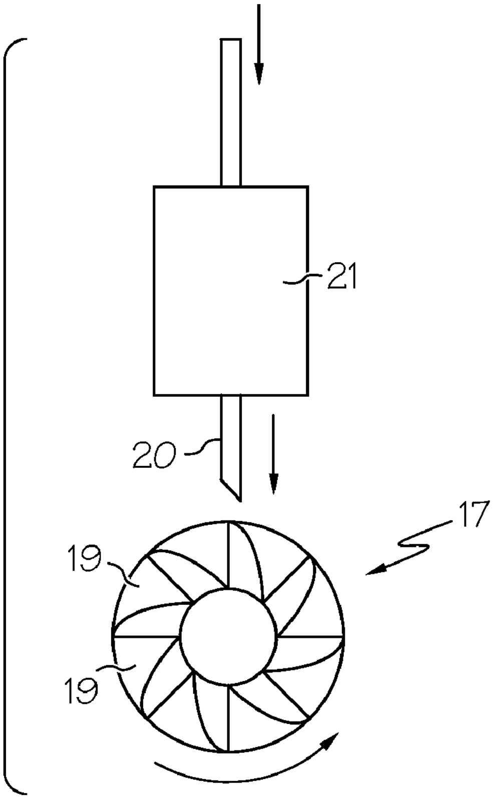
FIG. 6B is a cross-sectional view of the rotating hub of the pill dispensing device of FIG. 1, according to an exemplary embodiment of the present inventive concept.

As illustrated in FIGS. 5, 6A and 6B, the core of the hub 17 has deep recesses 19 in the material of the hub 17, which are essentially perpendicular to the axis of rotation and are located in succession along the curved surface of the hub 17. These recesses 19 receive the locking rod 20. The locking rod 20, while in place in a recess 19, physically prevents the hub 17 from rotating. The distance from one recess to the next represents a linear distance equivalent to a single pill advance episode. The leading side of the recess may be angled or curved to facilitate the return of the locking rod 20.

The rotating hub 17 is of a width sufficient to allow the pill strand 37 to advance between the hub teeth 18. The size of the pill being dispensed is a determining factor in the thickness of the hub 17, as the thickness of the hub 17 through its axis is greater than the width of the pill being dispensed. Given the large variation in pill size and shapes, the pill dispensing device may be designed in various sizes, or be able to accommodate a variety of hub widths. The hub teeth 18 are spaced apart to complement the spacing to the serrations 35 in the pill strand 37. This allows for firm engagement of the pill strand 37 by the rotating hub 17 sufficient to exert a linear force to reliably advance the pill strand 37 against friction resistance and minor material flexing resistance of the pill strand 37 itself.

Referring to FIGS. 6A and 6B, FIG. 6A is a side view of the rotating hub 17 of the pill dispensing device 200 of FIG. 1, according to an exemplary embodiment of the present inventive concept. FIG. 6B is a top, cross-sectional view of the rotating hub 17 of the pill dispensing device 200 of FIG. 1, according to an exemplary embodiment of the present inventive concept. The hub locking mechanism, as illustrated in FIGS. 6A and 6B, is composed of the sturdy locking rod 20 and a mechanism 21 for moving the locking rod 20 back and forth along its lengthwise axis, such as an electromechanical solenoid. Other electromechanical devices may be employed. The locking rod 20 is withdrawn by means of standard electronically-operated piston/rod movement, which is a standard electromechanical solenoid device or other mechanical device for retracting the rod a short distance, sufficient to allow for advance of the hub 17.

The locking rod 20 is under spring tension to remain in place in the recess 19 of the hub 17 core, effectively locking the device from dispensing. When a programmed time lapses indicating that a pill is available to be dispensed, the auditory outputs, for example a beeping noise, and visual outputs, for example a flashing light, indicate to the patient/user that a pill is available for dispensing. The programmed time is based on the prescription provided by the clinician that the pharmacist has programmed into the device 200. At that time, the electromechanical solenoid withdraws the locking rod 20 from the recess 19. The patient/user may then turn the knob 10 to advance the pill 37. The locking rod 20 is released from the withdrawn state by the electromechanical solenoid 21 when the hub 17 is advanced by the turning of the knob 10. As a result, the end of the locking rod 20 rides along the hub 17 under the spring force as the hub 17 is turned. As the next recess in succession is rotated into position aligned with the locking rod 20, the spring rapidly returns the locking rod 20 to the next successive recess 19, again locking the hub 17 from advancing. The return of the locking rod 20 to the recess 19 is under significant spring force and/or solenoid power to achieve a rapid movement and return of the locking rod 20 to the locking state, and to prevent inadvertent or inappropriate intentional advance of the pill strand 37.

The locking rod 20 has a high degree of physical sturdiness, especially with regard to resisting shear forces from the rotation of the hub 17, as the primary function of the locking rod 20 is to prevent advance of the hub 17 until the dispense time programmed into the device 200. During a programmed dispense time the locking rod 20 is withdrawn from the recess 19 by the electromechanical solenoid 21 a distance sufficient to allow the end of the locking rod 20 to clear the recess 19 in the hub 17, thereby allowing rotation of the hub 17, and the patient/user rotates the knob 10. The locking rod 20 is under spring force to return to the secure position within the next recess 19, as well as by the force of the electromechanical solenoid 21.

The dimensions of the locking rod are selected based on both the dimensions of the recesses 19 and the strength of the material desired to resist reasonable forces. The shapes of the surfaces of the recesses 19 in the hub 17 are such that they facilitate the rapid and secure redeployment of the locking rod 20. This is achieved by providing a narrow surface between recesses 19 and a sloping return to the next recess/locked position. The angle of the recess 19 in the hub 17 in relation to the central axis of the hub 17 and the locking rod 20 may also be altered to facilitate the redeployment of the rod. The recesses 19 in the hub 17 are shaped to facilitate the rapid return of the locking rod 20 to the secure position by providing a short distance between the trailing end of one recess 19 and the leading end of the next recess 19, and by angling or curving the leading side of the recess 19. Additional strength can be obtained by other configurations which angle the locking rod 20 to greater than 90 degree angles against the rotation of the hub 17. The distance between each recess 19 represents a single pill advance episode, and is standardized to the pill strand 37, not the pill itself, and can be a fixed feature of the hub 17.

Figure 7A:
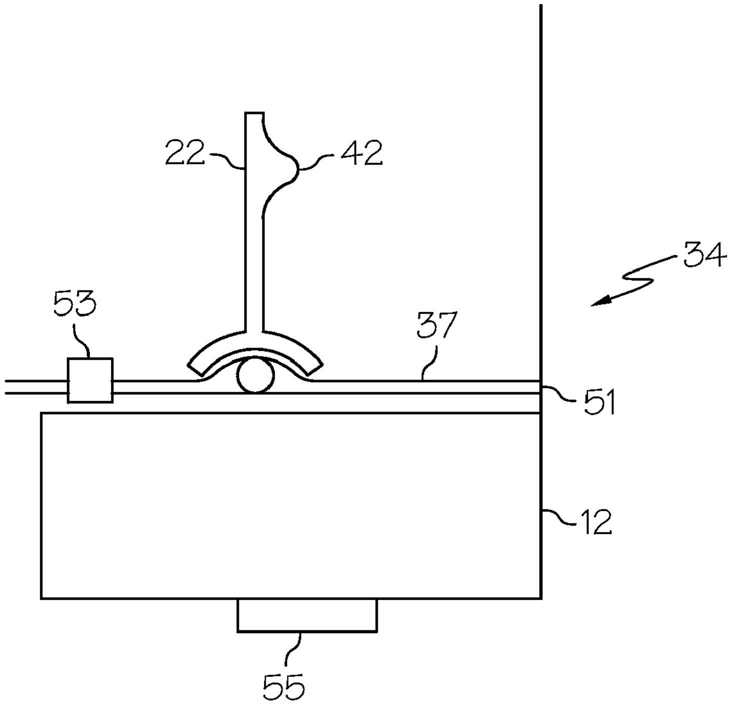
FIGS. 7A and 7B are cross-sectional views of an extruding chamber of the pill dispensing device of FIG. 1, according to an exemplary embodiment of the present inventive concept.
Figure 7B:
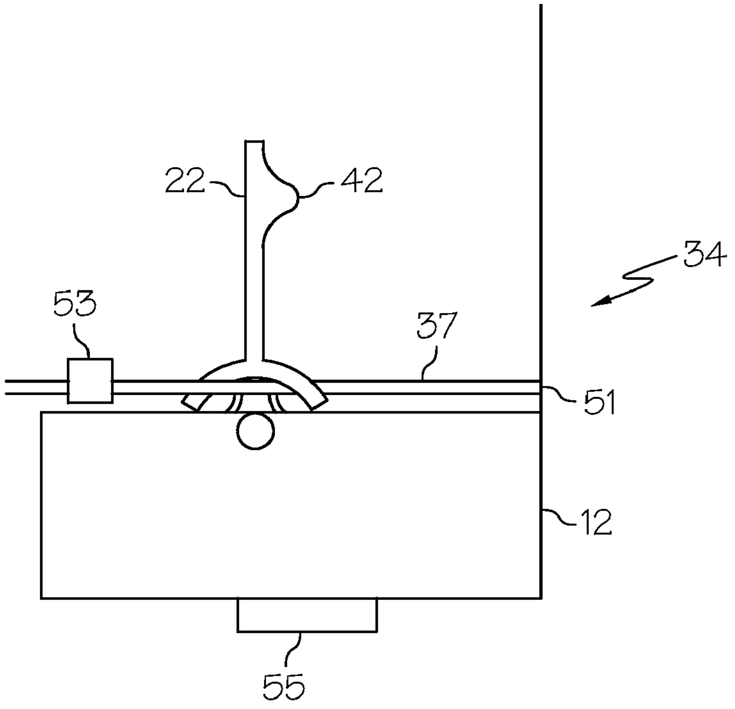

FIGS. 7A and 7B are cross-sectional views of an extruding chamber of the pill dispensing device of FIG. 1, according to an exemplary embodiment of the present inventive concept. Referring to FIGS. 4A, 7A and 7B, the pill strand 37 is advanced by the rotating hub 17 into the extruding chamber 34, where the sliding rod or extruding rod 22 is advanced by the patient/user in order to extrude the pill from the packaging material. The extruding rod 22 provides the means by which the pill is extruded from the packaging materials into the patient/user accessible holding chamber 12. The pill strand 37 is advanced past the hub 17 along pathway 23 of the pill strand 37 by the rotation of the knob 10 during at a programmed time into the extruding chamber 34. The extruding chamber 34 is between the bottom end of the extruding rod 22 in a retracted position and the holding chamber 12. The extruding chamber 34 includes integral, rigid shoulders 53 which support the sides of the pill strand 37 during extrusion of the pill from the pill strand 37 against the perpendicular force of the extruding rod 22. The end of the extruding rod 22 is disposed at the top of the extruding chamber 34 in its spring-retracted position. When the pill strand 37 has been advanced so that a pill is within the extruding chamber 34, the extruding rod 22 is advanced sufficiently to extrude the pill from the packaging materials. The extruding rod 22 is advanced by the patient/user sliding the thumb tab 42, which extends through the slot 50, in a direction towards the pill. The extruding rod 22 pushes the pill out of the pill strand 37. The pill then enters by gravity into the holding chamber 12, where the patient/user can easily access the pill being dispensed.

The extruding rod 22 is a rod under spring tension which is operated by the patient/user using the thumb tab 42 to slide the extruding rod 22 towards the extruding chamber 34. The extruding rod moves freely along slot 50 with the advance of the thumb tab 42. Repeated movement of the extruding rod 22 will not have any consequence without advance of the hub 17, since the extruding rod 22 cannot advance the pill strand 37. The extruding rod 22 includes the thumb tab 42, which is a physical surface or grip on its external surface and which allows for easy and ergonomic engagement of the extruding rod 22 by the patient/user in a single linear direction. The end of the extruding rod 22 that contacts the pill strand 37 is shaped to minimize physical trauma to the pill. For example, the internal end of the extruding rod 22 has a slightly rounded surface to minimize pill trauma. When the extruding rod 22 is advanced against spring force by the power of the patient/user, the concave end of the rod is pressed into the packaging materials, causing the pill to be extruded from the bubble pack.

As illustrated in FIGS. 7A and 7B, the pill, once extruded from the packaging, is allowed to enter the holding chamber 12 by gravity. The holding chamber 12 is easily accessed by the patient/user to obtain the appropriately dispensed medication. As illustrated in FIGS. 1, 2, 3, 4A, 4B, 7A and 7B, the holding chamber 12 is at the end of the device 200, and is the chamber into which the pills are moved following extraction from the packaging material of the pill strand 37. The holding chamber 12 is accessed by a standard screw cap 55, which can be easily opened by the patient/user. In an exemplary embodiment, the screw cap 55 may include a child-proof type cap. Once the pill has been extruded from the packaging, the pill strand is allowed with the next advancing movement to exit the device through an opening 51 of appropriate size, where it can be removed and disposed. This is assisted by the serrations 36 between each pill on the pill strand 37.

Figure 8A:
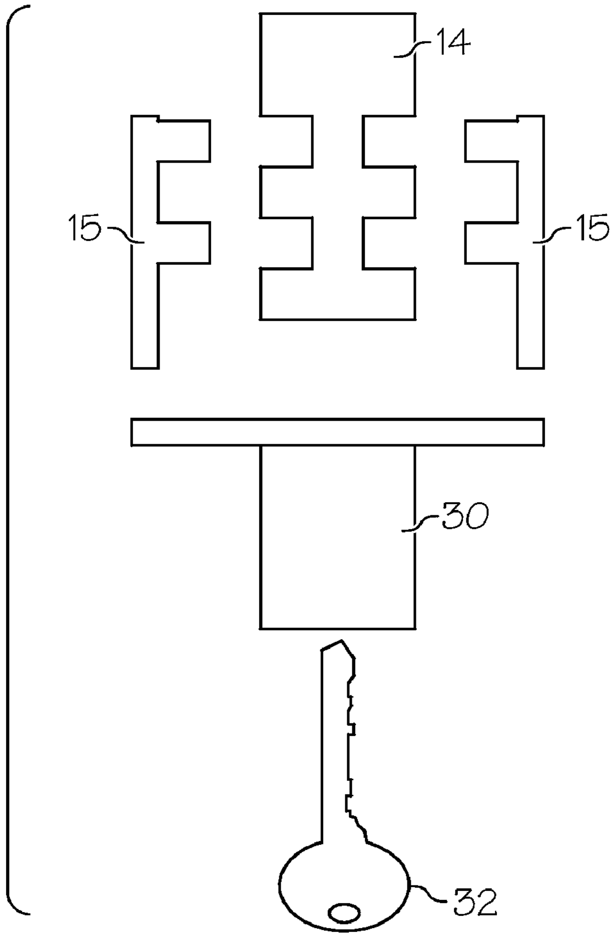
FIG. 8A is a cross-sectional view of a docking assembly of the pill dispensing device of FIG. 1, according to an exemplary embodiment of the present inventive concept.
Figure 8B:
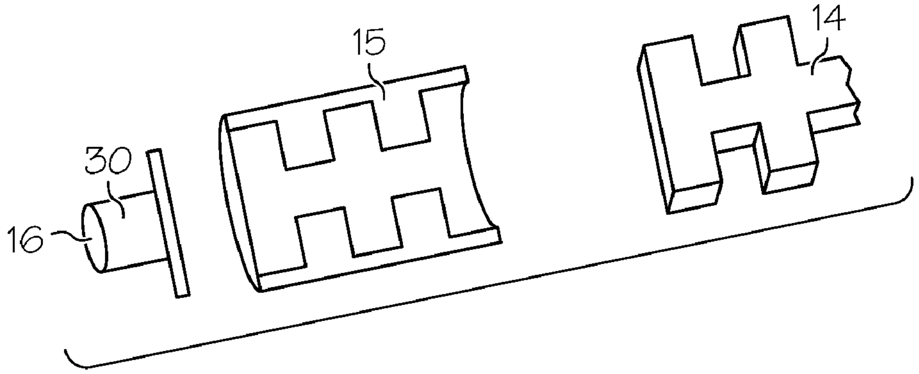
FIG. 8B is an exploded cross-sectional view of the docking assembly of FIG. 8A, according to an exemplary embodiment of the present inventive concept.
Figure 8C:
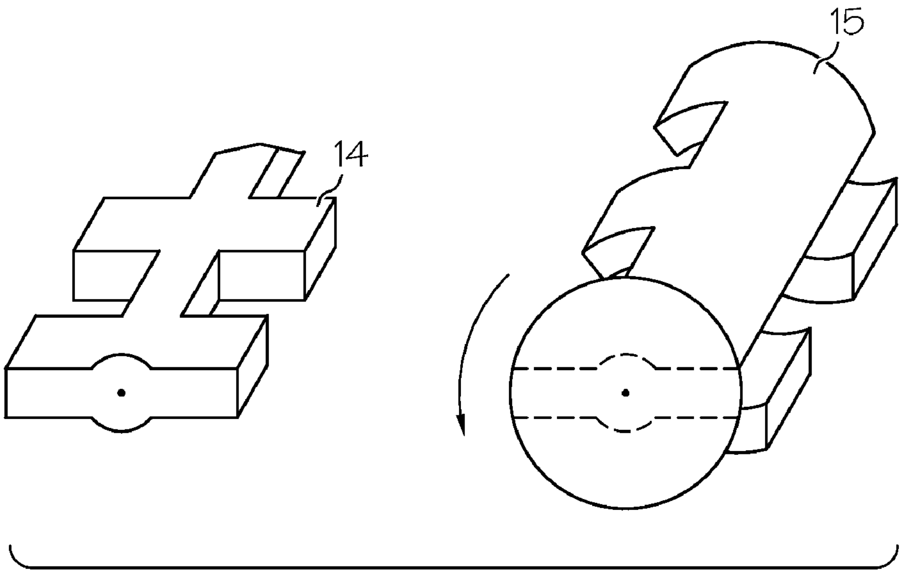
FIG. 8C is an exploded view of an alternative embodiment of the docking assembly of FIG. 1.

As noted above, the storage chamber component 2 and the main body 1 of the device 200 are locked together by means of the docking mechanism 13. FIG. 8A is cross-sectional view of a docking assembly of the pill dispensing device 200 of FIG. 1, according to an exemplary embodiment of the present inventive concept. FIG. 8B is an exploded cross-sectional view of the docking assembly of FIG. 8A according to an exemplary embodiment of the present invention. FIG. 8C is an exploded view of an alternative embodiment of the docking assembly of FIG. 1. FIGS. 8A-8C illustrate the docking mechanism 13. The docking mechanism 13 mates with the lug 14 on the storage chamber component 2 and includes the rotating locking sleeve 15 within a mating section of the main body 1. A key 32 is inserted into the keyhole 16 and lock 30 of the main body 1. The lock 30 may be any of a number of key/tumbler styles. In one exemplary embodiment, the lock is a circular or cam key and lock mechanism.

Upon rotation by a key 32, the locking sleeve 15 moves into a position in which it physically engages the lug 14 from the storage compartment 2, and prevents the lug 14 from being extracted. Any number of physical configurations between a lug 14 and lock may be used. In one exemplary embodiment, a flat lug 14 mates with a rotating locking sleeve 15. In FIG. 8C, the locking sleeve 15 is circular. The pharmacist or clinician has the key 32 to the device 200. When the pharmacist receives the device 200 to be refilled, the pharmacist unlocks the device 200 using the key 32 and separates the main body 1 and the storage chamber component 2 in order to refill the device 200.

Referring to FIGS. 1, 2 and 3, the docking section 9 of the storage chamber component 2 is a hollow section which has an opening 33 to accept the pill strand 37 from the storage compartment 2. The pill strand 37 travels through opening 33 of the docking section 9 to another opening 39 of the docking section 9 which mates with the opening 7 of the main body 1, and through the opening 7 into the main body 1 of the dispensing device. When in the secured position, the opening 39 in the storage chamber component 2 matches or mates with the opening 7 or entry portal of the main body 1 of the dispensing device. The docking section 9 may have incorporated rounded surfaces or rails to guide the pathway of the pill strand with lower friction.

The docking section 9 has at least two primary configurations which allow for different sizes and shapes of storage chamber components 2. The difference in the configurations is in the placement of the opening 33 that allows transfer of the pill strand 37 from the storage chamber component 2 into the opening 33 of the docking section 9. The storage chamber components 2 are otherwise the same. In one configuration, the opening 33 from the storage chamber component 2 is located on the left face of the docking section 9. This allows for a storage chamber component 2 to extend away from the device, and may have greater flexibility in regard to the size of the storage chamber component 2. In the other configuration, the opening from the storage compartment is located on the bottom face of the docking section 9. This allows for a storage chamber component 2 to be below the main body 1 immediately adjacent to the bottom face of the main body 1, thereby minimizing the amount of horizontal space the entire dispensing device occupies.

A mating rail/track, as previously described, along the edge of the right and facing surface of the docking section 9 allows for a more secure bond between the storage chamber component 2 and the main body 1. The mating rail/track may also be incorporated into the bottom surface of the main body 1 in order to mate with a storage chamber component 2 that is configured to lie directly below the main body 1.

The opening 33 from the storage chamber component 2 is illustrated in the drawings as being located on the bottom face of the docking section 9, which has the storage chamber component 2 bound to the lower surface of the docking section 9, and feeds the pill strand from the storage chamber component 2 through an opening 33 in the bottom surface of the docking section 9. When connected and locked to the main body 1, the storage chamber component 2 is adjacent to the lower surface of the main body 1.

Figure 10A:
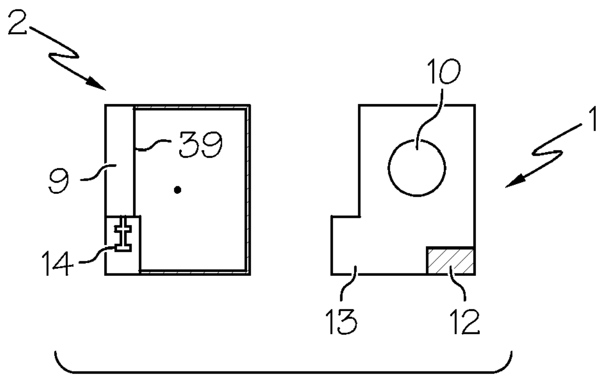
FIG. 10A is a top view of the main body and the storage chamber component of the pill dispensing device of FIG. 1 separated from each other.
Figure 10B:
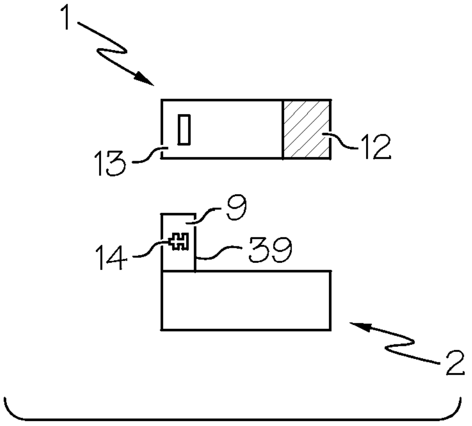
FIG. 10B is a front view of the main body and the storage chamber component of the pill dispensing device of FIG. 1 separated from each other.
Figure 10C:
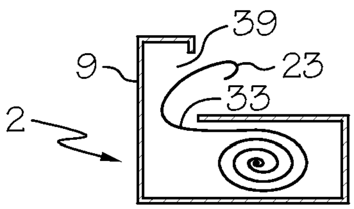
FIG. 10C is a cross-sectional view of the pathway of a pill strand through the storage chamber component of the pill dispensing device of FIG. 1.

FIGS. 10A-10C, 11A-11B and 12A-12B illustrate the connection of the main body 1 and the storage chamber component 2 and the loading of the pill strand 37 into the device 200. FIG. 10A is a top view of the main body 1 and the storage chamber component 2 of the pill dispensing device 200 of FIG. 1 separated from each other. FIG. 10B is a front view of the main body 1 and the storage chamber component 2 of the pill dispensing device 200 of FIG. 1 separated from each other. FIG. 10C is a cross-sectional view of the pathway 23 of a pill strand 37 through the storage chamber component 2 of the pill dispensing device 200 of FIG. 1. The pill strand 37 follows the pathway 23 through an opening 33 in the docking section 9 into the docking section 9 and through another opening 39 in the docking section 9. When loading the device 200, the pharmacist or clinician positions the pill strand 37 into the storage chamber component 2 and pulls the strand through the opening 33 in the docking section 9 and through the opening 39 in the docking section 9.

Figure 11A:
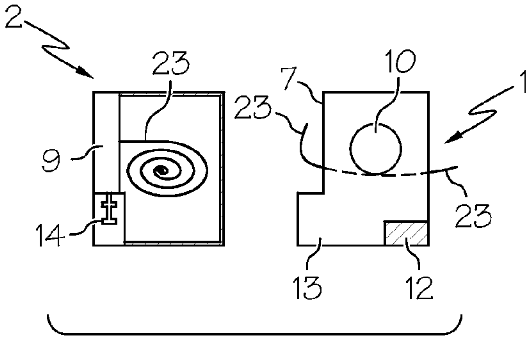
FIG. 11A is a top view of the pathway of a pill strand through the main body and a storage chamber component of the pill dispensing device of FIG. 1 when the main body and the storage chamber component are separated from each other.
Figure 11B:
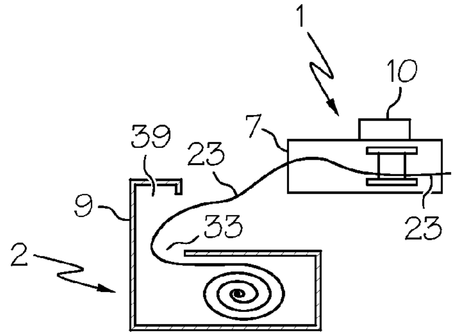
FIG. 11B is a front cross-sectional view of the pathway of a pill strand through the main body and a storage chamber component of the pill dispensing device of FIG. 1 when the main body and the storage chamber component are separated from each other.

FIG. 11A is a top view of the pathway 23 of a pill strand 37 through the main body 1 and the storage chamber component 2 of the pill dispensing device 200 of FIG. 1 when the main body 1 and the storage chamber component 2 are separated from each other. FIG. 11B is a cross-sectional view of the pathway 23 of the pill strand 37 through the main body 1 and a storage chamber component 2 of the pill dispensing device 200 of FIG. 1 when the main body 1 and the storage chamber component 2 are separated from each other. The pill strand 37 follows a pathway 23 through an opening 33 in the docking section 9 into the docking section 9, through another opening 39 in the docking section 9 and through the opening 7 of the main body 1 to engage the hub 17. When loading the device 200, the pharmacist engages the pill strand 37, which is extending through the opening 39 of the docking section 9, with the hub 17 through the opening 7.

Figure 12A:
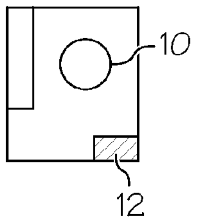
FIG. 12A is a top view of the main body and the storage chamber component of the pill dispensing device of FIG. 1 coupled together.
Figure 12B:
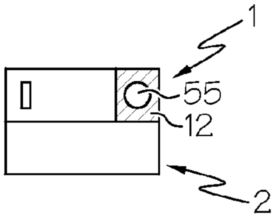
FIG. 12B is a front view of the main body and the storage chamber component of the pill dispensing device of FIG. 1 coupled together.

FIG. 12A is a top view of the main body 1 and the storage chamber component 2 of the pill dispensing device 200 of FIG. 1 coupled together. FIG. 12B is a front view of the main body 1 and the storage chamber component 2 of the pill dispensing device 200 of FIG. 1 coupled together. After the pill strand 37 is engaged with the hub 17, the pharmacist couples the main body 1 and the storage chamber component 2 together such that the opening 39 of the docking section 9 mates with the opening 7 of the main body 1 and such that the lug 14 is inserted into the sleeve 15, as illustrated in FIGS. 8A, 8B and 8C. Then, the pharmacist locks the main body 1 and the storage chamber component 2 together using key 32.

The device 200 has several sensors which allow it to monitor its function. The programming of the device documents and logs the number of pills dispensed and the times at which they are dispensed based on the activation of the electromechanical solenoid and the retraction of the locking rod 20. Additionally, an electrical contact sensor may be placed on the ratcheting mechanism, which will allow for secondary monitoring of the distance advanced by the hub. In addition, sensors may be provided which record attempts by the patient/user to rotate the knob 10.

Figure 13:
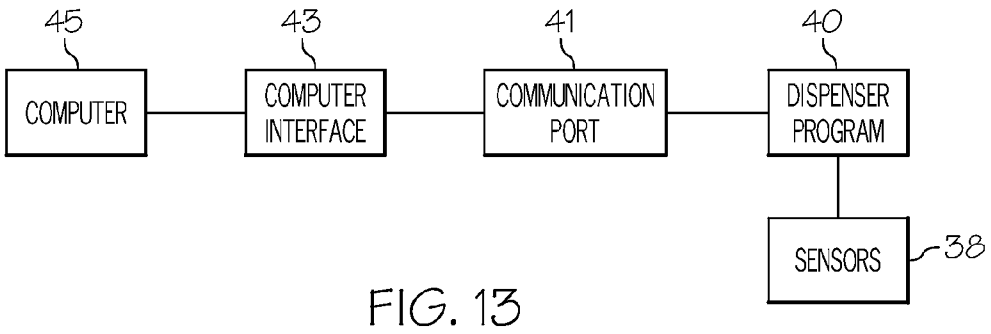
FIG. 13 is a schematic functional diagram of a system of a pill dispensing device, according to an exemplary embodiment of the present inventive concept.

FIG. 13 is a schematic diagram of a system of a pill dispensing device according to an embodiment of the present invention. The sensors 38 monitor the number of pills dispensed and the times at which they are dispensed based on the activation of the electromechanical solenoid 21 and the retraction of the locking rod 20. The sensors 38 can also monitor the distance advanced by the hub 17. The sensors can also monitor attempts by the user to rotate the knob 10. Control software or a dispenser program 40 processes the sensed data. A clinician and/or pharmacist may access the data from the dispenser program on his/her personal computer 45 through a computer interface 43, which connects to input/output interfaces or communication ports 41 of the dispenser. The clinician and/or pharmacist may program the dispenser program using their computers by connecting their computer 45 through computer interface 43 to the communication port 41, for example, a USB port, of the dispenser. The communications ports 45 provide access to the dispenser program 40.

Figure 14:
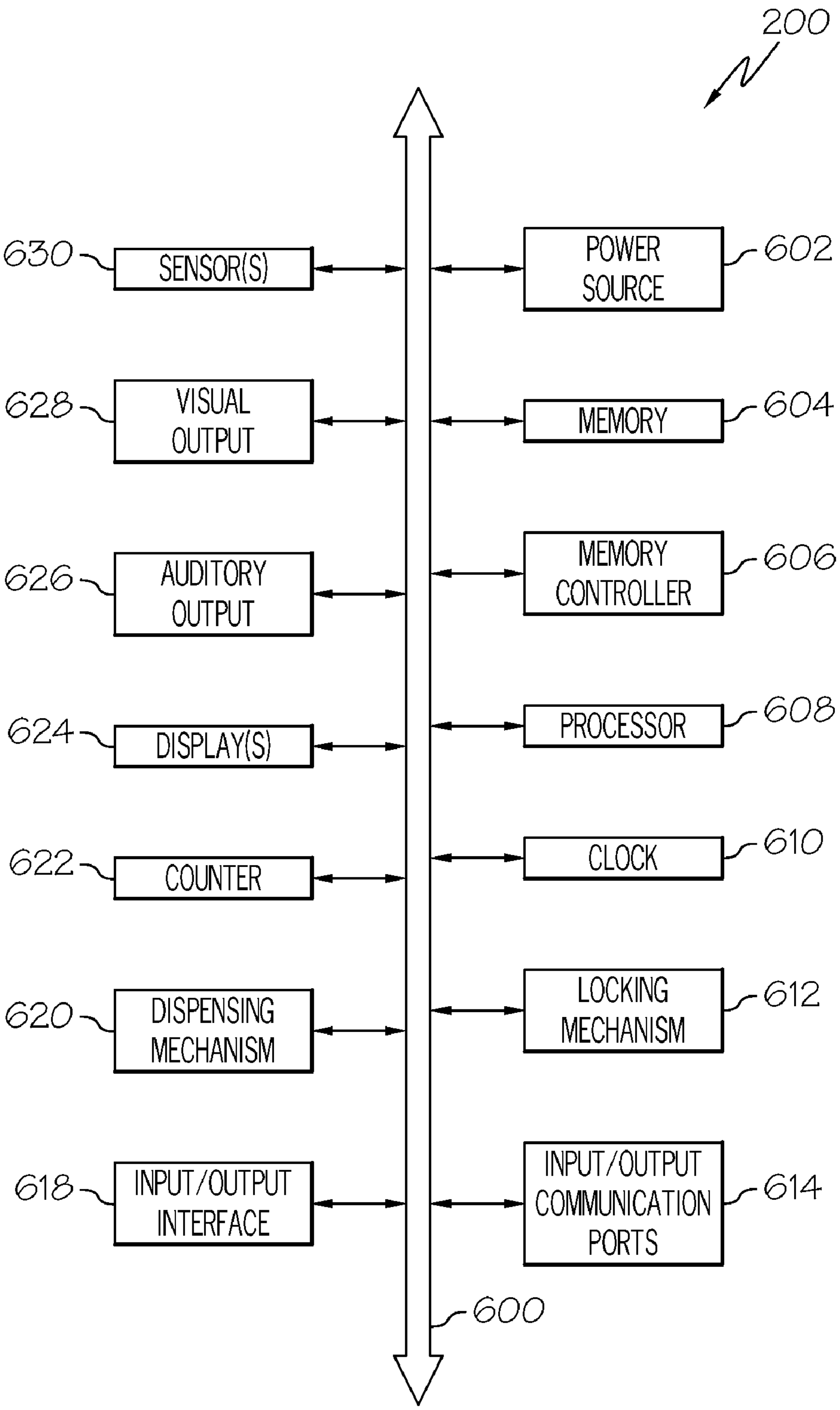
FIG. 14 is a schematic functional block diagram of the pill dispensing device of FIG. 1, according to an exemplary embodiment of the present inventive concept.

FIG. 14 is a schematic functional block diagram of the pill dispensing device 200 of FIG. 1, according to an exemplary embodiment of the present inventive concept. FIG. 14 illustrates the electrical components 59 of FIG. 5. The pill dispenser 200 includes a power source 602, memory 604 with a stored dispenser program or control software, a memory controller 606, a processor 608, a real time clock 610, a counter 622, at least one display 624, an auditory output 626, a visual output 628, for example, an LED light, an input/output interface 618, for example, button-type input/outputs, a dispensing mechanism 620, for example, the hub 17 and/or electrical motor 31, a locking mechanism 612, for example, the locking rod 20 and electromechanical solenoid 21, at least one sensor 630, at least one input/output communication port 614, and a communication bus 600 for interconnecting the components of the pill dispenser 200. The power source 602, for example, a battery, provides power to the device 200. The memory 604 and memory controller 606 store the data programmed by the pharmacist or clinician regarding the number of pills to be dispensed and when the pills are to be dispensed. The processor 608 controls the elements of the dispenser 200 based on the programmed data. The device 200 may be programmed by the pharmacist or clinician through the input/output communication ports 614 or through input/output interface 618. The pharmacist or clinician enters the parameters of the prescription into the program of the memory 604. The clock 610 provides timing data indicating when the pills should be dispensed and indicating the time when the pills are dispensed which is stored in the memory 604.

At a programmed time at which the pill becomes available to be dispensed, the visual output 628, for example, an LED light, provides a visual indication that a pill is available to be dispensed, and the auditory output 626, for example, a beeping noise, provides an auditory indication that a pill is available to be dispensed. The display 624 may also indicate that a pill is available to be dispensed. The display 624 may further indicate the time left until the next pill will be available to be dispensed. The display 624 may also indicate the number of pills already dispensed and the number of pills remaining in the device 200.

When the patient/user rotates the knob 10, the sensor 630 may indicate that an attempt has been made to access a pill and whether the pill is available for dispensing. The attempt is recorded in memory 604. If the pill is available for dispensing, the processor 608 controls the locking mechanism 612, or the electromechanical solenoid 21 and the locking rod 20, such that the electromechanical solenoid 21 withdraws the locking rod 20 from the recess 19. Then, the patient/user may rotate the hub 17 with the knob 10. The locking rod 20 is released from the withdrawn state by the electromechanical solenoid 21 upon the hub 17 being advanced by the turning of the knob 10, for example, by a single pill dispensing episode distance. As the next recess in succession is rotated into position aligned with the locking rod 20, the spring rapidly forces the locking rod 20 to return to the next successive recess 19, again locking the hub 17 from advancing. One of the sensors 630 senses whether a pill has been dispensed based on activation of the electromechanical solenoid 21 and the retraction of the locking rod 20. Additionally, one of the sensors 630 may be placed on the ratcheting mechanism, which will allow for secondary monitoring of the distance advanced by the hub 17. The sensed data is stored in the memory 604. The clinician and/or pharmacist may access the stored sensed data when the device is returned to be refilled, thus helping the clinician understand the patient's symptoms and aggravators so that the clinician can respond appropriately.

Upon the advancement of the dispensing mechanism 620 or hub 17, the pill strand 37 is advanced into the extruding chamber 34. The extruding rod 22 is then advanced by the patient/user sliding the thumb tab 42 which extends through the slot 50 in a direction toward the pill. The extruding rod 22 pushes the pill out of the pill strand 37. The counter 622 increases the count by one each time the hub 17 is advanced. The count is stored in the memory 604 and may be displayed on the display 624.

Figure 15:
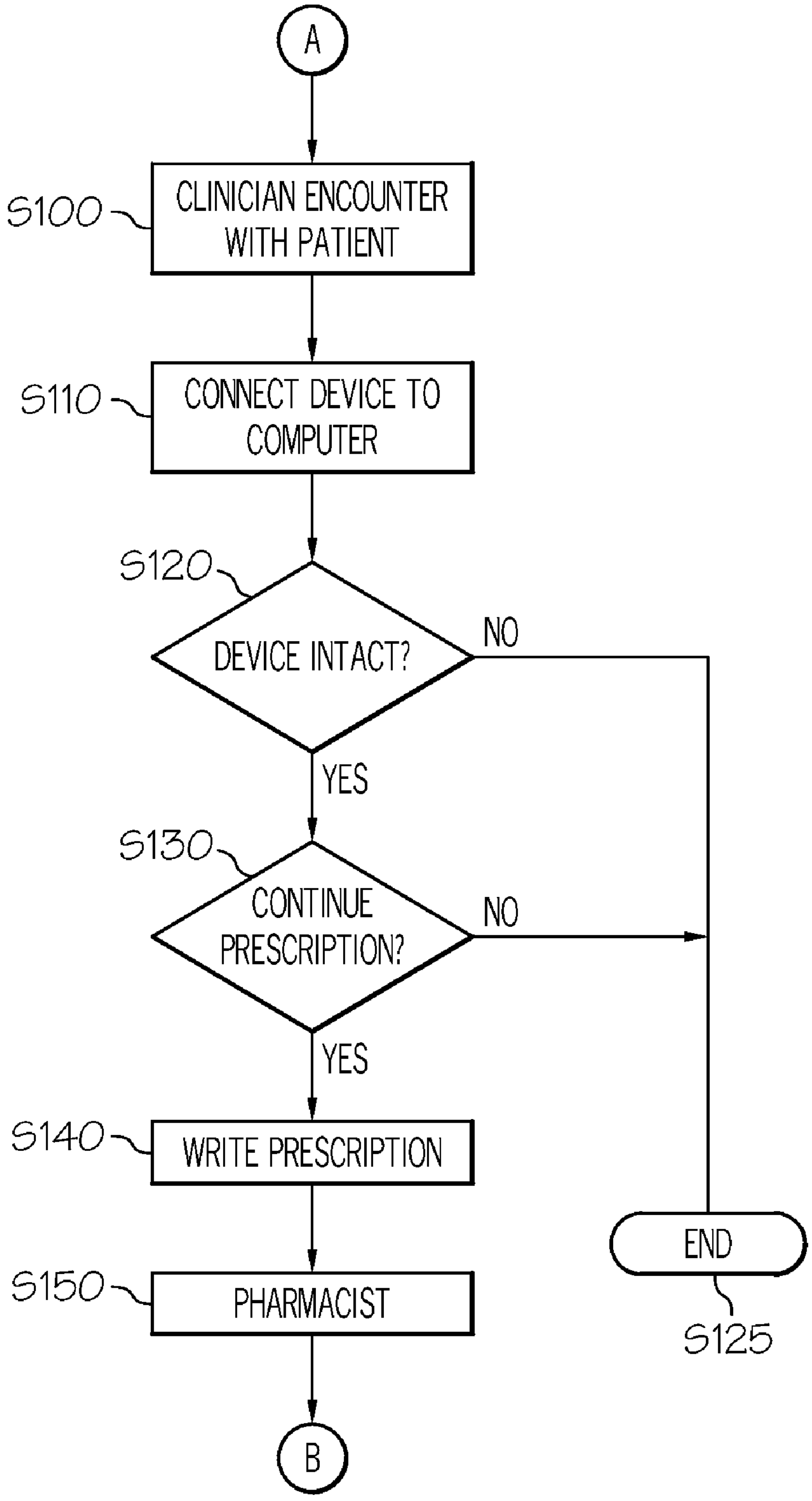
FIG. 15 is a schematic functional flow diagram illustrating a clinician's use of the pill dispensing device of FIG. 1, according to an exemplary embodiment of the present inventive concept.

FIG. 15 is a schematic functional flow diagram illustrating a clinician's use of the pill dispensing device 200 of FIG. 1, according to an exemplary embodiment of the present inventive concept. The clinician is a physician or other person controlling the treatment of the patient. When a patient has a need for the controlled medication, the patient contacts his/her clinician A. In step S100, a clinician meets with the patient. The clinician connects the pill dispensing device 200 to his/her computer in step S110. In step S120, the clinician determines whether the device 200 is intact, for example, whether the device 200 has been damaged or tampered with by observing the device 200. If the device 200 is not intact, the clinician will not continue prescribing the controlled medicine as the patient has shown misuse of the controlled medicine. If the device 200 is intact, in step S130, the clinician will consult with the patient and access the dispenser programming including the sensed data to determine whether to continue the prescription. If there is no longer a perceived need for the medication, the prescription will be discontinued, in step S125. In addition, if the programming of the dispenser indicates that the patient tried to access the medication inappropriately or in excess, which is recorded by the sensors 630 of FIG. 14, the clinician may decide to discontinue the prescription. However, if the clinician decides to continue the prescription, in step S140, the clinician writes a new prescription for the patient. Then, in step S150, the prescription is sent to the pharmacist B.

Figure 16:
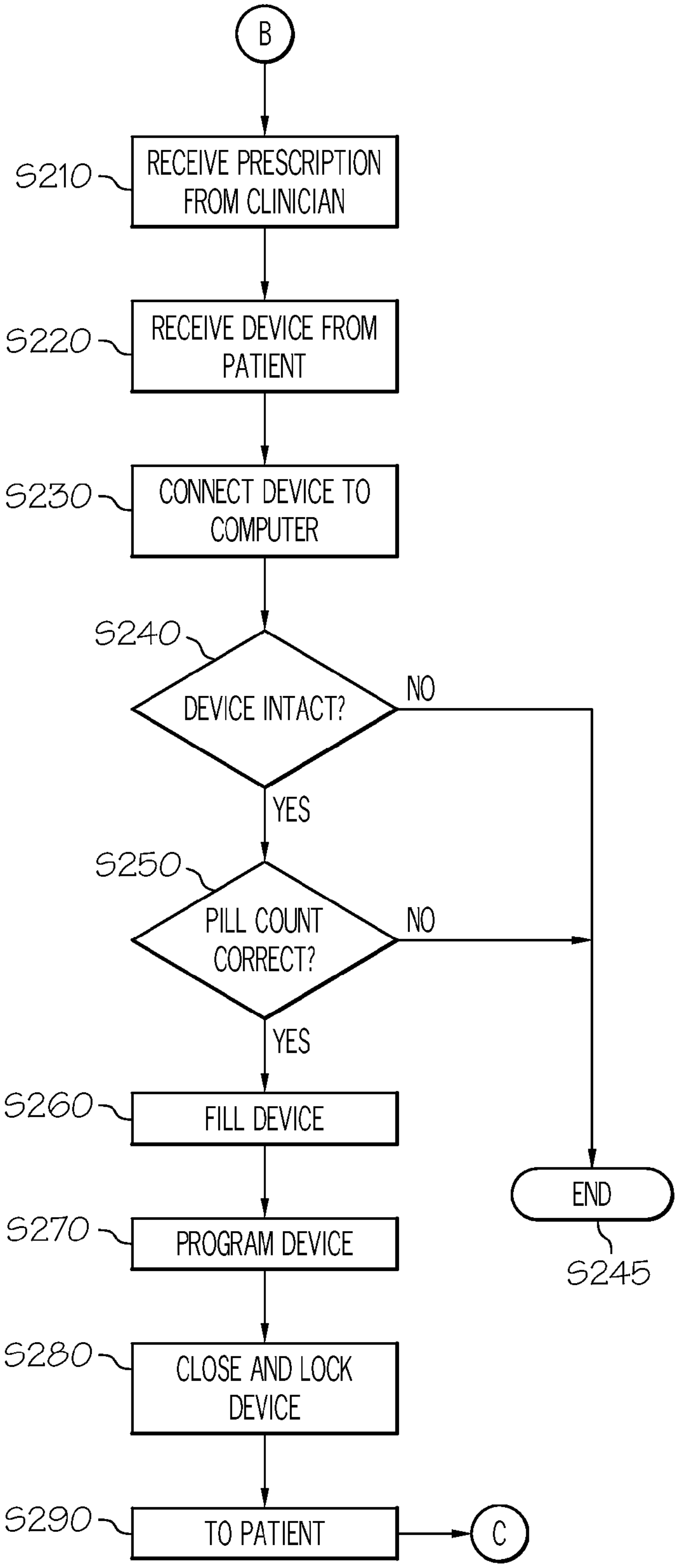
FIG. 16 is a schematic functional flow diagram illustrating a pharmacist's use of the pill dispensing device of FIG. 1, according to an exemplary embodiment of the present inventive concept.

FIG. 16 is a schematic functional flow diagram illustrating a pharmacist's use of the pill dispensing device 200 of FIG. 1, according to an exemplary embodiment of the present inventive concept. At B, the pharmacist receives the prescription from the clinician, in step S210, and receives the pill dispensing device 200 from the patient, in step S220. The pharmacist connects his/her computer to the pill dispensing device 200, in step S230. In step S240, the pharmacist determines whether the pill dispensing device 200 is intact. If the pill dispensing device 200 is not intact and/or shows signs of damage or having been tampered with, the prescription is not refilled, in step S245. If the pill dispensing device 200 is intact, the pharmacist determines whether the count of pills dispensed from the device 200 is correct, in step S250. If the pill count is not correct, the prescription may not be refilled or may be modified, in step S245. If the pill count is correct, the pharmacist fills the device 200 with the controlled medication, in step S260. The pharmacist then programs the device 200, in step S270, such that the pills are only released at predefined times based on the clinician's prescription. The pharmacist then closes and locks the device 200, in step S280, and returns the pill dispensing device 200 to the patient, in step S290.

Figure 17:
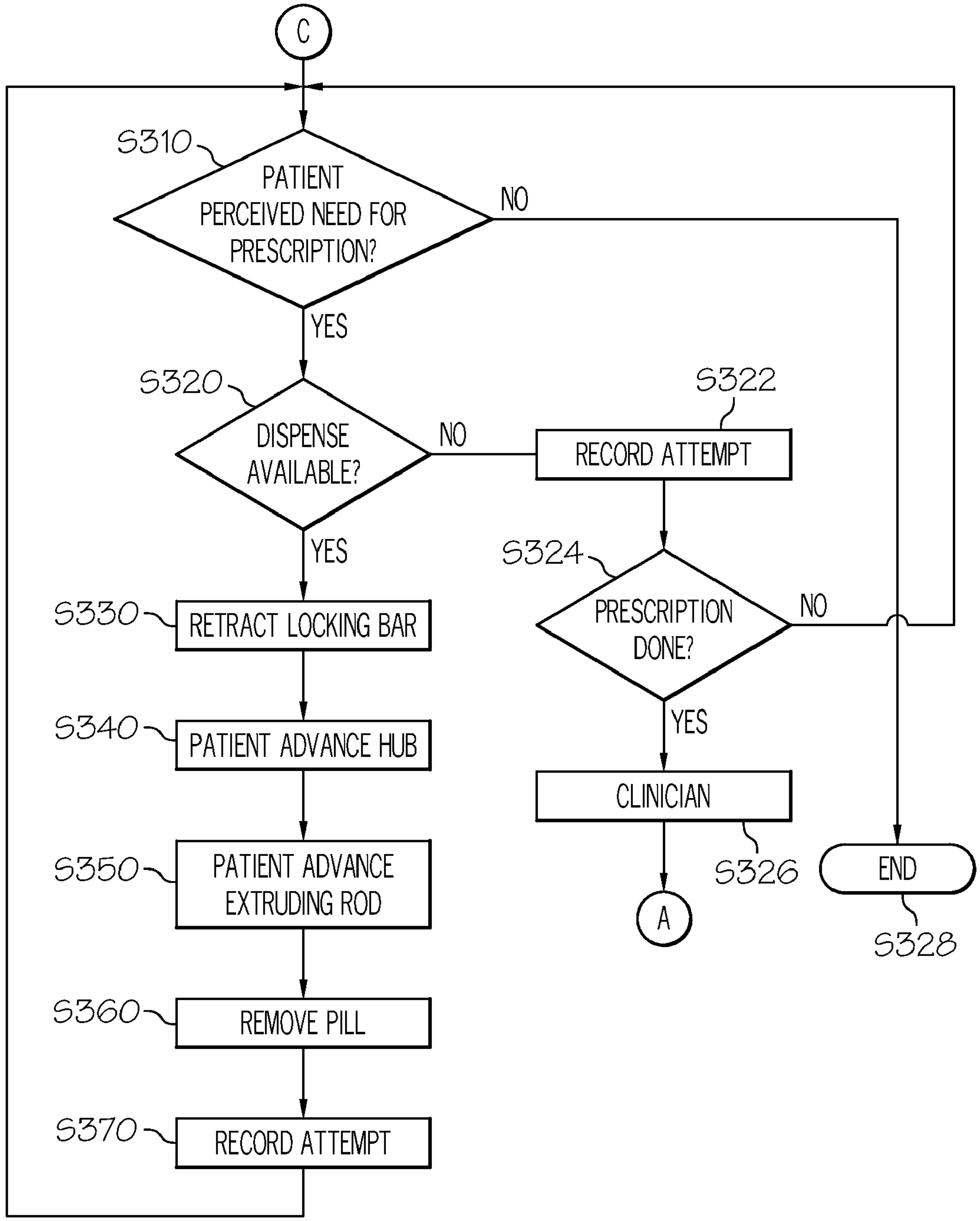
FIG. 17 is a schematic functional flow diagram illustrating a patient's use of the pill dispensing device of FIG. 1, according to an exemplary embodiment of the present inventive concept.

FIG. 17 is a schematic functional flow diagram illustrating a patient's use of the pill dispensing device 200 of FIG. 1, according to an exemplary embodiment of the present inventive concept. At C, the patient receives the device 200 from the pharmacist. The patient only accesses the pill dispensing device 200 when there is a perceived need for the prescription. If there is a perceived need for the medication by the patient, in step S310, the patient determines whether a pill is available to be dispensed, in step S320. If the patient rotates the knob 10, whether or not a pill is available, a sensor senses the attempt to access a pill, and the program records the attempt to access the pill, in step S322. The device 200 then determines whether the prescription is completed, in step S324. If the prescription is exhausted, then the patient returns to the clinician, in step S326. If the prescription is not complete, the system either returns to step S310 or prevents further access to the device 200, in step S328. If a pill is available to be dispensed in step S320, the locking bar 20 is retracted by the electromechanical solenoid 21, in step S330, and the patient advances the hub with the external knob 10, in step S340. Once the pill is advanced, the patient advances the extruding rod 22 in step S350, which pushes the pill into the holding chamber 12. The patient then removes the pill from the holding chamber 12, in step S360. The accessing of the pill is recorded. When the patient perceives a need for another pill, the process starts again, in step S310.

While this invention has been particularly shown and described with references to preferred embodiments thereof, it will be understood to those skilled in the art that various changes in form and details may be made herein without departing from the spirit and scope of the invention as defined in the appended claims.

What is claimed is:

1. A portable medication dispenser, comprising:

a detachable storage chamber storing pills packaged in a pill strand, the detachable storage chamber having a first opening for the pill strand to pass through and a docking section; and a main body, comprising:

- an external, rotating knob;
- an opening for the pill strand to pass through;
- a docking section to secure to the docking section of the storage chamber;
- a rotating hub rotatable by the external knob, the rotating hub engaging the pill strand moving the pill strand through the storage chamber and the main body and comprising cogged edges for engaging with the pill strand and recesses spaced apart a predetermined distance along the center of a curved surface of the rotating hub;
- a locking rod under spring tension to be positioned securely within the recesses of the rotating hub locking the rotating hub from advance;
- a controlling mechanism controlling the locking rod controlled by programming of the device to retract the locking rod allowing advance of the rotation hub at predetermined times; and
- an extruding rod under spring tension movable by force to move in a direction to force a pill out of the pill strand into a holding chamber;

wherein the portable medication dispenser is programmable to control the locking rod and controlling mechanism to control the advancement of the rotating hub and pill strand.

2. The portable medication dispenser of claim 1 further comprising a visual display.

3. The portable medication dispenser of claim 2, wherein the visual display is an LCD display.

4. The portable medication dispenser of claim 1 further comprising auditory outputs.

5. The portable medication dispenser of claim 1 further comprising input/output ports.

6. The portable medication dispenser of claim 1 further comprising a power supply.

7. The portable medication dispenser of claim 1, wherein the controlling mechanism is an electromechanical solenoid.

8. The portable medication dispenser of claim 1, wherein the predetermined distance between recesses corresponds to the size of a single unit of the pill strand.

9. The portable medication dispenser of claim 1, wherein the extruding rod is moved by a user.

10. The portable medication dispenser of claim 1, wherein the docking section of the storage chamber comprises a second opening through which the pill strand passes through into the docking section.

11. The portable medication dispenser of claim 1, further comprising a locking mechanism locking the storage chamber to the main body at the docking section of the storage chamber and the docking section of the main body.

12. The portable medication dispenser of claim 11, wherein the locking mechanism comprises:

a lug coupled to the docking section of the storage chamber;

a rotating sleeve in the docking section of the main body rotatable around the lug;

a key hole and lock in the docking section of the main body; and a key for rotating the rotating sleeve around the lug.

13. The portable medication dispenser of claim 1, further comprising a ratchet assembly restricting movement of the rotating hub in a single direction.

14. The portable medication dispenser of claim 13, wherein the ratchet assembly comprises a gear and pawl.

15. The portable medication dispenser of claim 14, wherein the ratchet assembly further comprises a sensor measuring the advance of the rotating hub.

16. The portable medication dispenser of claim 13, wherein the ratchet assembly further comprises an electrical motor.

17. The portable medication dispenser of claim 1, further comprising a shaft of the knob and rotating hub being a first fail point.

18. A method of dispensing pills, comprising:

programming a pill dispensing device to output pills at predetermined times;

filling a storage chamber of the pill dispensing device with a pill strand;

pulling the pill strand through an opening in the storage chamber to engage with a rotating hub in a main body of the pill dispensing device;

coupling the storage chamber to the main body and locking the storage chamber and main body together using a locking mechanism;

providing an indicator when a pill is available to be dispensed from the pill dispensing device;

controlling a control mechanism to retract a locking rod from a recess in the rotating hub allowing advance of the rotating hub at the programmed predetermined times and to return the locking rod to a subsequent recess upon advance of the rotating hub;

rotating a knob on the main body to advance the hub and the pill strand;

extruding a pill from the pill strand using an extruding rod under spring tension movable by force to move in a direction to force a pill out of the pill strand into a holding chamber.

19. The method of claim 18, further comprising sensing and storing the number of pills dispensed and the distance advanced by the rotating hub.

20. The method of claim 19, further comprising sensing and storing attempts to rotate the knob and dispense a pill.

* * * * *

UNITED STATES PATENT AND TRADEMARK OFFICE

CERTIFICATE OF CORRECTION

PATENT NO. : 8,135,497 B2
APPLICATION NO. : 12/686535
DATED : March 13, 2012
INVENTOR(S) : Matthew I. Joslyn It is certified that error appears in the above-identified patent and that said Letters Patent is hereby corrected as shown below:

In the Specification

In column 3, line 33, change “into a holding” to --into a holding chamber.--

Signed and Sealed this
Fourteenth Day of April, 2015

Michelle K. Lee
*Director of the United States Patent and Trademark Office*